US012647406B2

(12) United States Patent
McGuinness et al.

(10) Patent No.: US 12,647,406 B2
(45) Date of Patent: Jun. 2, 2026

(54) CROSS APPLICATION AUTHORIZATION FOR ENTERPRISE SYSTEMS

(71) Applicant: OKTA, INC., San Francisco, CA (US)

(72) Inventors: Karl McGuinness, Oakland, CA (US);
Kamron Batmanghelich, Long Beach, CA (US)

( * ) Notice: Subject to any disclaimer, the term of this patent is extended or adjusted under 35 U.S.C. 154(b) by 119 days.

(21) Appl. No.: 18/479,793

(22) Filed: Oct. 2, 2023

(65) Prior Publication Data

US 2025/0112907 A1      Apr. 3, 2025

(51) Int. Cl.
*H04L 9/40*                (2022.01)

(52) U.S. Cl.
CPC ........ *H04L 63/0815* (2013.01); *H04L 63/105* (2013.01); *H04L 63/20* (2013.01)

(58) Field of Classification Search
CPC ... H04L 63/0815; H04L 63/105; H04L 63/20; H04L 9/3213; H04L 63/0807; G06F 21/41
USPC ............................................................. 726/4
See application file for complete search history.

(56) References Cited

U.S. PATENT DOCUMENTS

| | | | |
|---|---|---|---|
| 2016/0021097 A1 | 1/2016 | Shrotri | |
| 2019/0394204 A1* | 12/2019 | Bansal | .................... G06F 21/41 |
| 2023/0091451 A1 | 3/2023 | Fujii et al. | |
| 2025/0190607 A1* | 6/2025 | Roper, Jr. | ........... G06F 21/6218 |

FOREIGN PATENT DOCUMENTS

| | | | | |
|---|---|---|---|---|
| CN | 114553480 A | * | 5/2022 | ........... H04L 9/3268 |
| CN | 114902195 A | | 8/2022 | |

OTHER PUBLICATIONS

"International Search Report and Written Opinion of the International Searching Authority," issued in connection with Int'l Appl. No. PCT/US2024/048455, dated Nov. 25, 2024 (13 pages).

* cited by examiner

*Primary Examiner* — Aubrey H Wyszynski
(74) *Attorney, Agent, or Firm* — Holland & Hart LLP

(57)                ABSTRACT

An identity provider (IdP) may receive an application programming interface (API) access policy that supports cross-application authorization between a first application and a second application associated with the IdP that may be configured to issue tokens on behalf of a user of the first application and second application. The IdP may then receive a request for a first token from the first application to obtain a second token where the request may be on behalf of a user. Based on receiving the request, the IdP may transmit the first token to the first application in accordance with the API access policy. Further, the IdP may exchange the first token provided by the first application for the second token which may be usable to access an API of the second application in accordance with the API access policy.

20 Claims, 10 Drawing Sheets

105-a 250
220

260
255
225

Identity Provider
205

Content Application
215

235

265
240
245
230

Collaboration
Application
210

First Token

Second Token

API Access Policy

Enabling Message

Configuration Message

Request Message

200

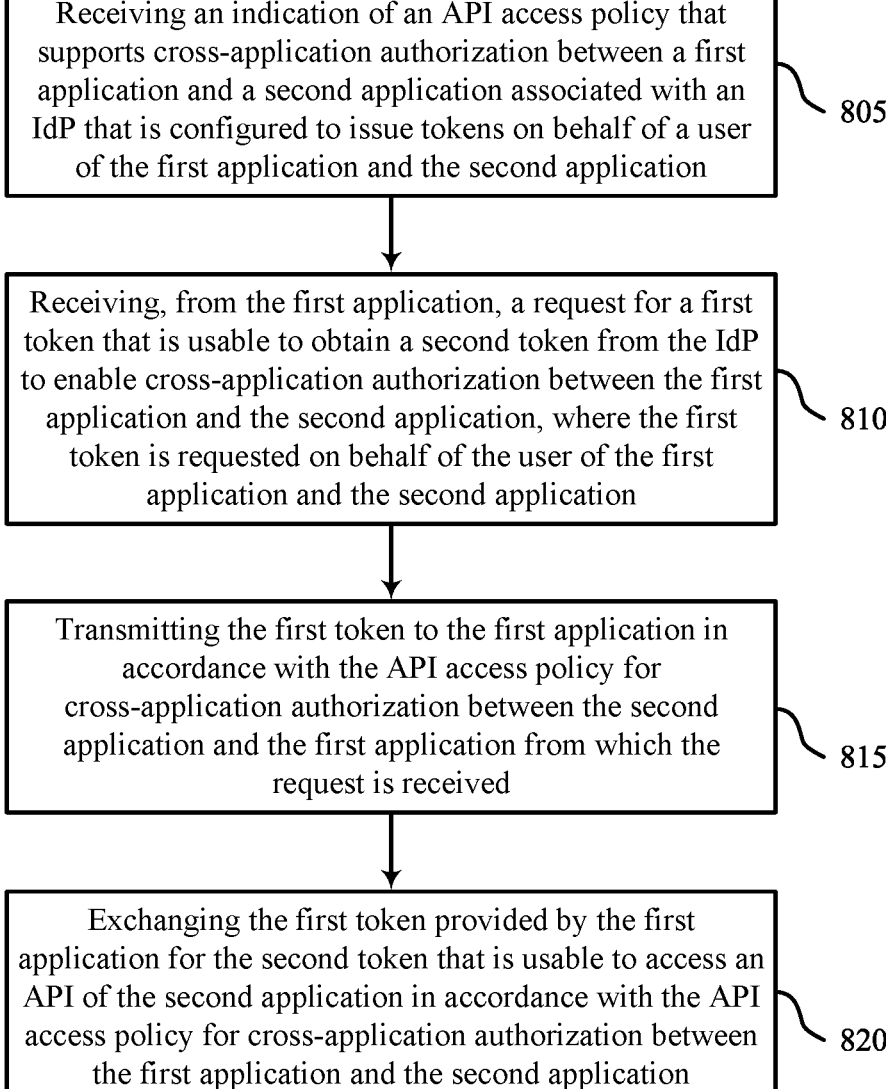

Receiving an indication of an API access policy that supports cross-application authorization between a first application and a second application associated with an IdP that is configured to issue tokens on behalf of a user of the first application and the second application

805

Receiving, from the first application, a request for a first token that is usable to obtain a second token from the IdP to enable cross-application authorization between the first application and the second application, where the first token is requested on behalf of the user of the first application and the second application

810

Transmitting the first token to the first application in accordance with the API access policy for cross-application authorization between the second application and the first application from which the request is received

815

Exchanging the first token provided by the first application for the second token that is usable to access an API of the second application in accordance with the API access policy for cross-application authorization between the first application and the second application

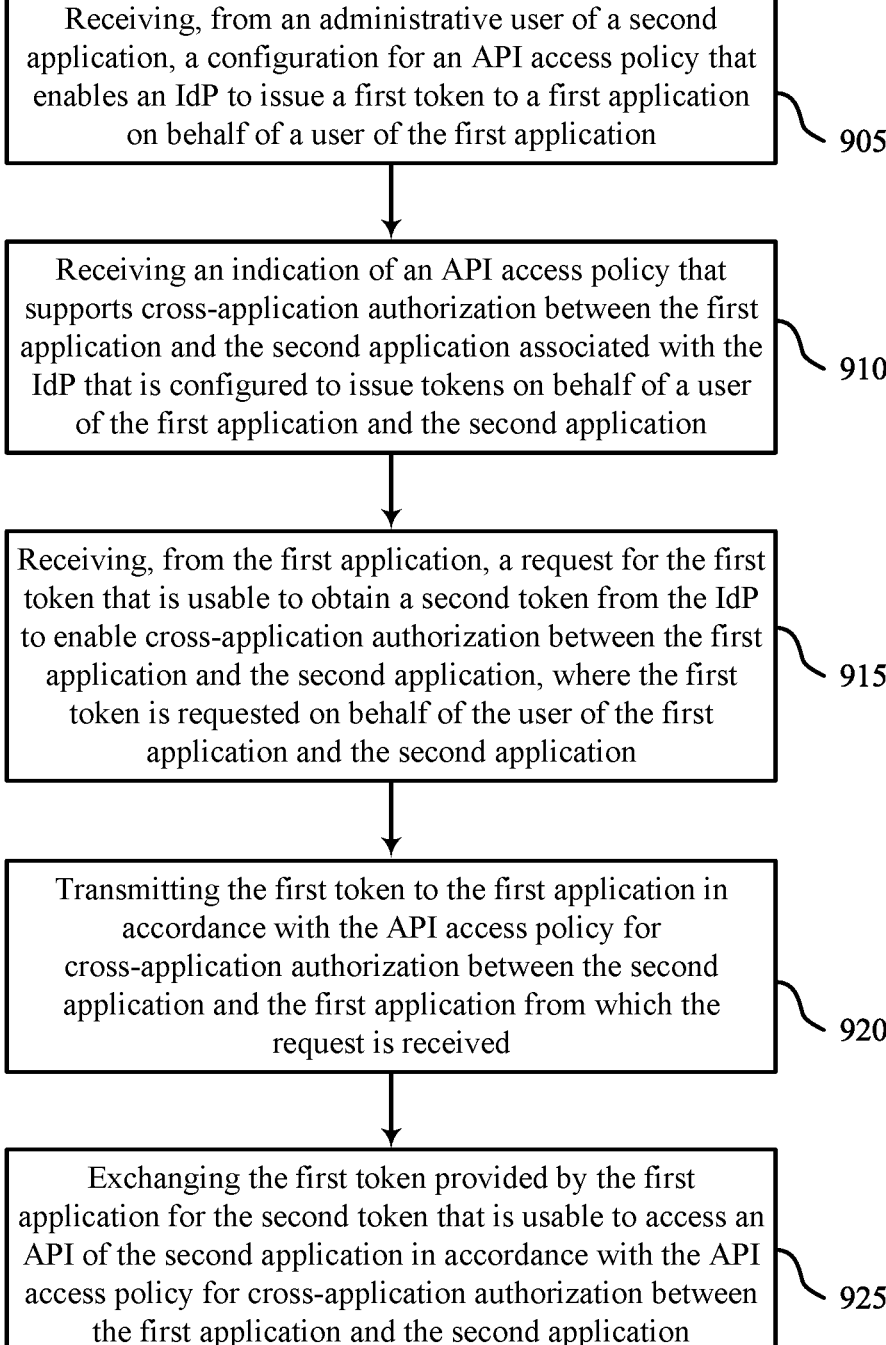

Receiving, from an administrative user of a second application, a configuration for an API access policy that enables an IdP to issue a first token to a first application on behalf of a user of the first application

905

Receiving an indication of an API access policy that supports cross-application authorization between the first application and the second application associated with the IdP that is configured to issue tokens on behalf of a user of the first application and the second application

910

Receiving, from the first application, a request for the first token that is usable to obtain a second token from the IdP to enable cross-application authorization between the first application and the second application, where the first token is requested on behalf of the user of the first application and the second application

915

Transmitting the first token to the first application in accordance with the API access policy for cross-application authorization between the second application and the first application from which the request is received

920

Exchanging the first token provided by the first application for the second token that is usable to access an API of the second application in accordance with the API access policy for cross-application authorization between the first application and the second application

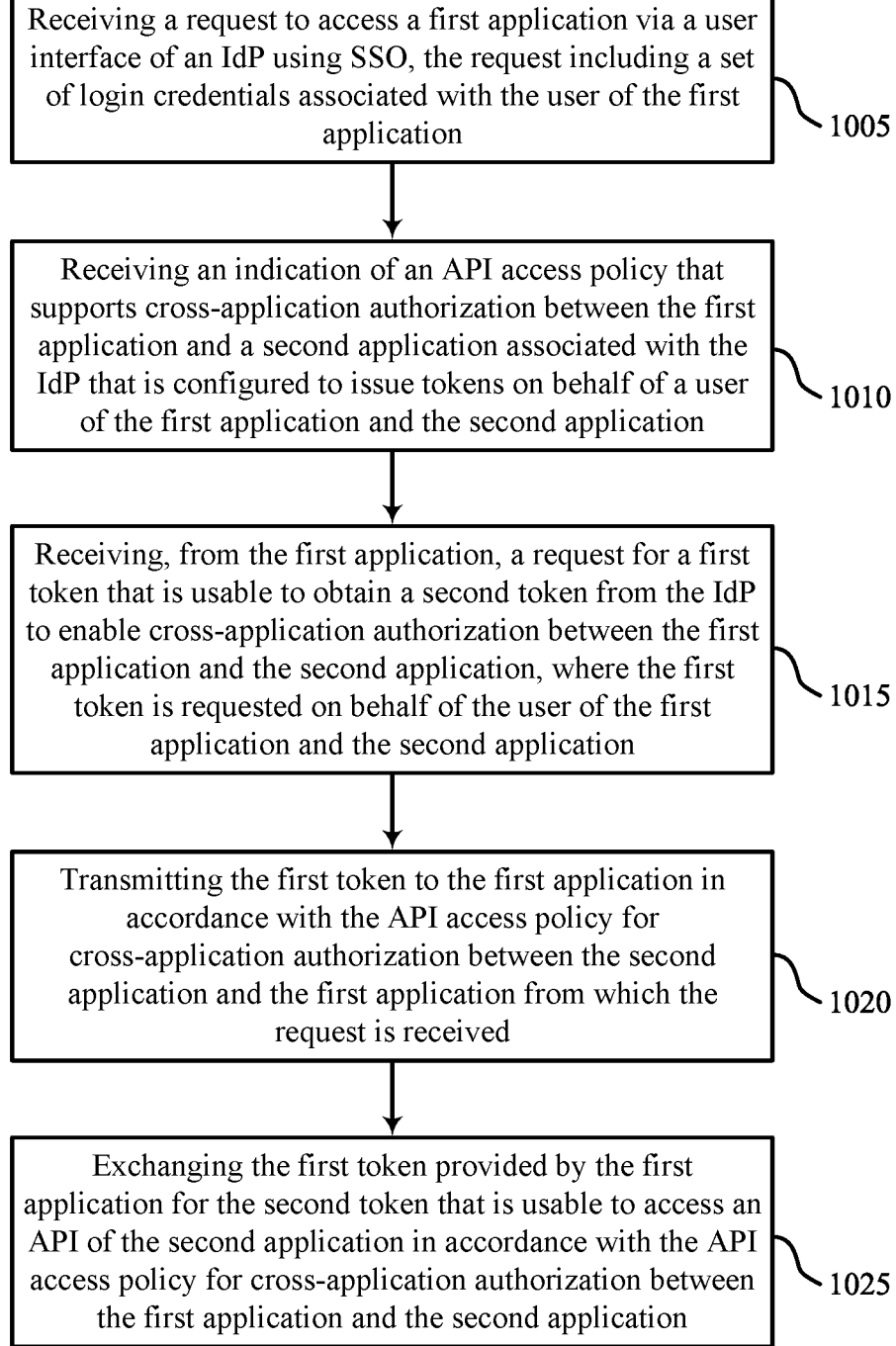

Receiving a request to access a first application via a user interface of an IdP using SSO, the request including a set of login credentials associated with the user of the first application

1005

Receiving an indication of an API access policy that supports cross-application authorization between the first application and a second application associated with the IdP that is configured to issue tokens on behalf of a user of the first application and the second application

1010

Receiving, from the first application, a request for a first token that is usable to obtain a second token from the IdP to enable cross-application authorization between the first application and the second application, where the first token is requested on behalf of the user of the first application and the second application

1015

Transmitting the first token to the first application in accordance with the API access policy for cross-application authorization between the second application and the first application from which the request is received

1020

Exchanging the first token provided by the first application for the second token that is usable to access an API of the second application in accordance with the API access policy for cross-application authorization between the first application and the second application

CROSS APPLICATION AUTHORIZATION FOR ENTERPRISE SYSTEMS

FIELD OF TECHNOLOGY

The present disclosure relates generally to identity management, and more specifically to cross-application authorization for enterprise systems.

BACKGROUND

An identity management system may be employed to manage and store various forms of user data, including usernames, passwords, email addresses, permissions, roles, group memberships, etc. The identity management system may provide authentication services for applications, devices, users, and the like. The identity management system may enable organizations to manage and control access to resources, for example, by serving as a central repository that integrates with various identity sources. The identity management system may provide an interface that enables users to access a multitude of applications with a single set of credentials.

Some organizations may use the identity management system to provide a seamless log-in process for one or more applications. Such applications may be configured separately, such that an application may have to perform multiple authentication procedures to access a user's data within other applications. Thus, to integrate an application with the other applications, a user may perform an authentication procedure to allow the application to access the user's data of each other application. For organizations that have a relatively large quantity of applications, however, providing access to the user's data from each application used by the operation individually may be time-consuming and inefficient.

SUMMARY

A method for cross-application authorization is described. The method may include: receiving an indication of an application programming interface (API) access policy that supports cross-application authorization between a first application and a second application associated with an identity provider (IdP) that is configured to issue tokens on behalf of a user of the first application and the second application; receiving, from the first application, a request for a first token that is usable to obtain a second token from the IdP to enable cross-application authorization between the first application and the second application, where the first token is requested on behalf of the user of the first application and the second application; transmitting the first token to the first application in accordance with the API access policy for cross-application authorization between the second application and the first application from which the request is received; and exchanging the first token provided by the first application for the second token that is usable to access an API of the second application in accordance with the API access policy for cross-application authorization between the first application and the second application.

An apparatus for cross-application authorization is described. The apparatus may include one or more memories storing processor-executable code, and one or more processors coupled with the one or more memories. The one or more processors may be individually or collectively operable to execute the code to cause the apparatus to: receive an indication of an API access policy that supports cross-application authorization between a first application and a second application associated with an IdP that is configured to issue tokens on behalf of a user of the first application and the second application; receive, from the first application, a request for a first token that is usable to obtain a second token from the IdP to enable cross-application authorization between the first application and the second application, where the first token is requested on behalf of the user of the first application and the second application; transmit the first token to the first application in accordance with the API access policy for cross-application authorization between the second application and the first application from which the request is received; and exchange the first token provided by the first application for the second token that is usable to access an API of the second application in accordance with the API access policy for cross-application authorization between the first application and the second application.

Another apparatus for cross-application authorization is described. The apparatus may include: means for receiving an indication of an API access policy that supports cross-application authorization between a first application and a second application associated with an IdP that is configured to issue tokens on behalf of a user of the first application and the second application; means for receiving, from the first application, a request for a first token that is usable to obtain a second token from the IdP to enable cross-application authorization between the first application and the second application, where the first token is requested on behalf of the user of the first application and the second application; means for transmitting the first token to the first application in accordance with the API access policy for cross-application authorization between the second application and the first application from which the request is received; and means for exchanging the first token provided by the first application for the second token that is usable to access an API of the second application in accordance with the API access policy for cross-application authorization between the first application and the second application.

A non-transitory computer-readable medium storing code for cross-application authorization is described. The code may include instructions executable by one or more processors to: receive an indication of an API access policy that supports cross-application authorization between a first application and a second application associated with an IdP that is configured to issue tokens on behalf of a user of the first application and the second application; receive, from the first application, a request for a first token that is usable to obtain a second token from the IdP to enable cross-application authorization between the first application and the second application, where the first token is requested on behalf of the user of the first application and the second application; transmit the first token to the first application in accordance with the API access policy for cross-application authorization between the second application and the first application from which the request is received; and exchange the first token provided by the first application for the second token that is usable to access an API of the second application in accordance with the API access policy for cross-application authorization between the first application and the second application.

In some examples of the methods, apparatuses, and non-transitory computer-readable media described herein, receiving the indication of the API access policy may include operations, features, means, or instructions for receiving, from an administrative user of the second application, a configuration for the API access policy that enables the IdP to issue the first token to the first application on behalf of a user of the first application.

Some examples of the methods, apparatuses, and non-transitory computer-readable media described herein may further include operations, features, means, or instructions for enabling the first application to request the first token from the IdP on behalf of the user in accordance with the API access policy for cross-application authorization between the first application and the second application.

In some examples of the methods, apparatuses, and non-transitory computer-readable media described herein, the second application may be configured to trust the IdP to issue the first token to one or more applications associated with the IdP without additional input from the user.

In some examples of the methods, apparatuses, and non-transitory computer-readable media described herein, the IdP may be configured to operate as an API single sign-on (SSO) provider for the first application and the second application.

Some examples of the methods, apparatuses, and non-transitory computer-readable media described herein may further include operations, features, means, or instructions for receiving a request to access the first application via a user interface of the IdP using SSO, the request including a set of login credentials associated with the user of the first application.

Some examples of the methods, apparatuses, and non-transitory computer-readable media described herein may further include operations, features, means, or instructions for issuing the first token and the second token to the first application based on determining that the user is a member of one or more groups that satisfy a group membership criterion within the API access policy that integrates the first application with the second application.

In some examples of the methods, apparatuses, and non-transitory computer-readable media described herein, the API access policy defines what user information the first application is able to access via the API of the second application.

In some examples of the methods, apparatuses, and non-transitory computer-readable media described herein, the API access policy may be configured by an administrative user of the IdP.

In some examples of the methods, apparatuses, and non-transitory computer-readable media described herein, the first token includes an open authorization (OAuth) authorization grant and the second token includes one or both of an OAuth access token or an OAuth refresh token that is usable to access the API of the second application.

In some examples of the methods, apparatuses, and non-transitory computer-readable media described herein, the API access policy supports three-legged OAuth (3LO) between the first application and the second application.

BRIEF DESCRIPTION OF THE DRAWINGS

FIGS. 8 through 10 show flowcharts illustrating methods that support cross-application authorization for enterprise systems in accordance with aspects of the present disclosure.

DETAILED DESCRIPTION

Figure 1:
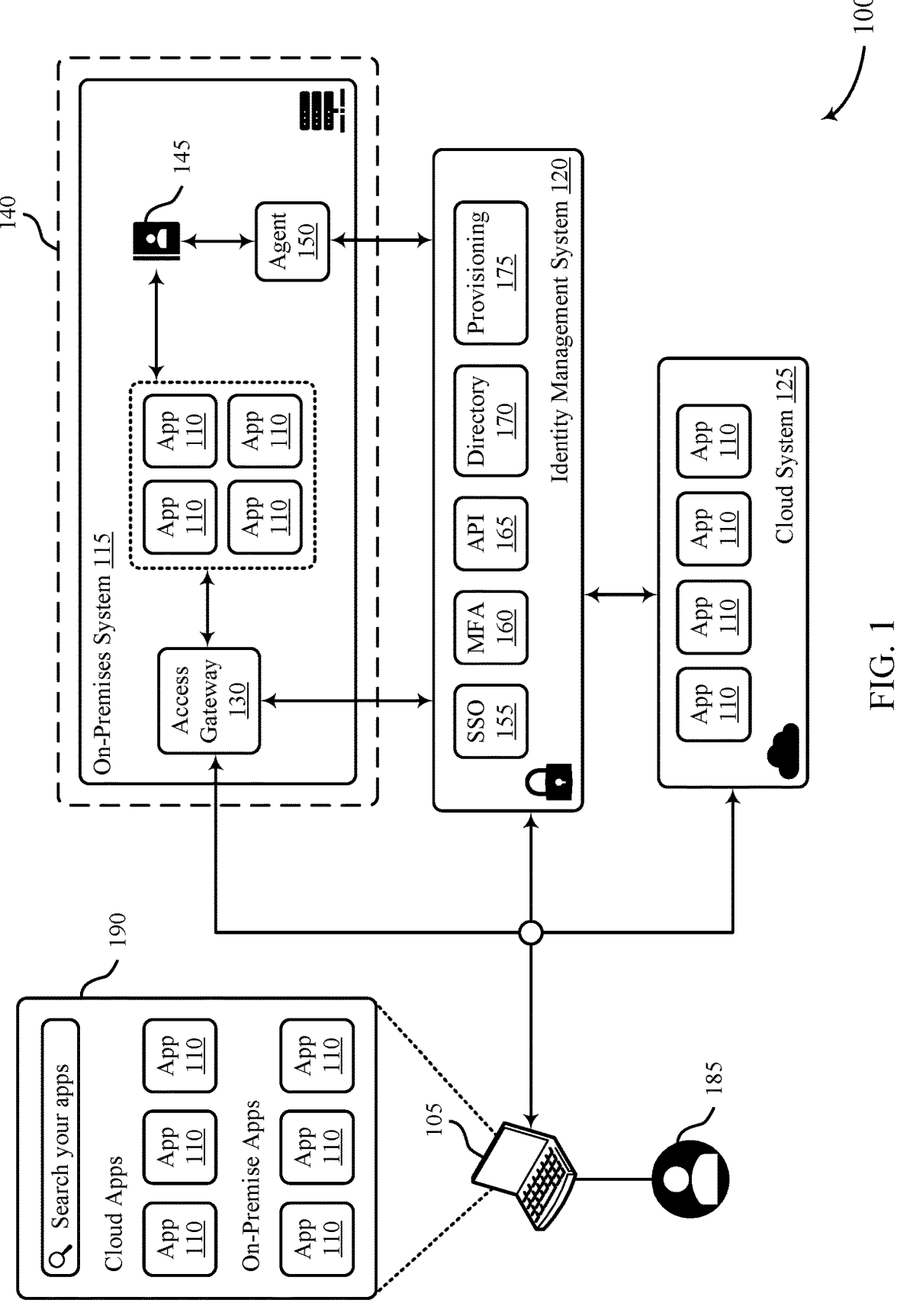
FIGS. 1 through 3 illustrate examples of computing systems that support cross-application authorization for enterprise systems in accordance with aspects of the present disclosure.

In some networks, an organization may have a set of users, and may rely on a relatively large and diverse set of applications to perform the operations of the organization. In some cases, the organization may use multiple different applications from multiple different vendors to build a technology stack. For example, the organization may use an application from a first vendor for communications, an application from a second vendor for a custom relationship manager (CRM), and an application from a third vendor for a human resources solution. Such configuration may be referred to as a best-of-breed configuration where an organization may use applications from different vendors to provide an efficient and relatively high performing solution for each job function of the organization. In some other cases, an organization may use a suite of applications from a single vendor, which may be referred to as a single-vendor configuration. However, using a best-of-breed configuration may provide more efficient and reliable applications for users of an organization.

To provide cross-application authorization between applications associated with an identity provider (IdP), the IdP may receive an application programming interface (API) access policy that may be configured to issue tokens on behalf of users of an application. Further, the IdP may receive a request from a first application for a first token (e.g., a bootstrap token that includes an open authorization (OAuth) authorization grant) on behalf of a user of the first application and a second application. The first token may be usable to obtain a second token (e.g., an access token that includes an OAuth access token, an OAuth refresh token, or both) from the IdP to enable cross-application authorization between the first application and the second application. In response to receiving the request, the IdP, may transmit the first token to the first application in accordance with the API access policy for cross-application authorization between the second application and the first application (e.g., the application that transmitted the request for the first token. The IdP may then exchange the first token provided by the first application for the second token that may be usable to access an API of the second application in accordance with the API access policy for the cross-authorization between the first application and the second application. Such API access policy may enable a seamless integration between applications with minimal user input therefore reducing the complexing of the integration of applications.

In some examples, the IdP may receive a configuration from an administrative user of the second application for the API access policy that enables the IdP to issue the first token to the first application on behalf of a user of the first application. Additionally, or alternatively, an administrative user of the second application may configure the second application to trust the IdP to issue the first token to one or more applications associated with the IdP (e.g., the first application) while refraining from receiving additional input from a user. As such, the IdP may be enabled to provide tokens for the second application to the first application on behalf of users of the first application. Thus, the first application may then be capable of obtaining the second token which the first application may use to make one or more API requests to the second application to grant the first application access to a user's data within the second application.

Further, as the IdP provides the tokens for the first application to access the data of the second application, the IdP may save the user time by preventing the user from authorizing the access for each application associated with the IdP individually. For example, the IdP may be associated with 20 applications and prior to the techniques of the present disclosure described herein if the user wanted one of the applications to have access to data from the other 19 applications, the user would have to authorize the access for each individual application. As such, by using the techniques of the present disclosure, the IdP may provide an application with the tokens required to access a user's data within a separate application while refraining from receiving any additional input from the user for the authorization. Therefore, the techniques of the present disclosure may allow a for a relatively more seamless integration of the applications.

Aspects of the disclosure are initially described in the context of computing systems and process flows. Aspects of the disclosure are further illustrated by and described with reference to apparatus diagrams, system diagrams, and flow-charts that relate to techniques for cross-application authorization.

FIG. 1 illustrates an example of a computing system 100 that supports cross-application authorization for enterprise systems in accordance with various aspects of the present disclosure. The computing system 100 includes a computing device 105 (such as a desktop, laptop, smartphone, tablet, or the like), an on-premises system 115, an identity manage-ment system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The net-work may include various communication links, hubs, bridges, routers, switches, ports, or other physical and/or logical network components, which may be distributed across the computing system 100.

The on-premises system 115 (also referred to as an on-premises infrastructure or environment) may be an example of a computing system in which a client organiza-tion owns, operates, and maintains its own physical hard-ware and/or software resources within its own data center(s) and facilities, instead of using cloud-based (e.g., off-site) resources. Thus, in the on-premises system 115, hardware, servers, networking equipment, and other infrastructure components may be physically located within the "prem-ises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to) database management, analytics, machine learning (ML), artificial intelligence (AI), etc. Examples of cloud systems 125 include (AMAZON WEB SERVICES) AWS®, MICROSOFT AZURE®, GOOGLE CLOUD PLAT-FORM®, ALIBABA CLOUD®, ORACLE® CLOUD INFRASTRUCTURE (OCI), and the like.

The identity management system 120 may support one or more services, such as a single sign-on (SSO) service 155, a multi-factor authentication (MFA) service 160, an API service 165, a directory management service 170, or a provisioning service 175 for various on-premises applica-tions 110 (e.g., applications 110 running on compute resources of the on-premises system 115) and/or cloud applications 110 (e.g., applications 110 running on compute resources of the cloud system 125), among other examples of services. The SSO service 155, the MFA service 160, the API service 165, the directory management service 170, and/or the provisioning service 175 may be individually or collectively provided (e.g., hosted) by one or more physical machines, virtual machines, physical servers, virtual (e.g., cloud) servers, data centers, or other compute resources managed by or otherwise accessible to the identity manage-ment system 120.

A user 185 may interact with the computing device 105 to communicate with one or more of the on-premises system 115, the identity management system 120, or the cloud system 125. For example, the user 185 may access one or more applications 110 by interacting with an interface 190 of the computing device 105. In some implementations, the user 185 may be prompted to provide some form of iden-tification (such as a password, personal identification num-ber (PIN), biometric information, or the like) before the interface 190 is presented to the user 185. In some imple-mentations, the user 185 may be a developer, customer, employee, vendor, partner, or contractor of a client organi-zation (such as a group, business, enterprise, non-profit, or startup that uses one or more services of the identity man-agement system 120). The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the computing device 105). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity manage-ment system 120, which may serve as the IdP. For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using hypertext transfer protocol (HTTP) headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials associated with the user's account may be registered with the IdP (e.g., previously registered, or otherwise authorized for authentication of the user's identity via the IdP). The IdP may generate a security token (such as a SAML token or Oath 2.0 token) containing information associated with the identity and/or authentication status of the user 185 based on successful authentication of the user's identity.

The IdP may send the security token to the computing device 105 (e.g., the browser or application 110 running on the computing device 105). In some examples, the application 110 may be associated with a service provider (SP), which may host or manage the application 110. In such examples, the computing device 105 may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other benefits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., something the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a one-time passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. As described herein, OAuth refers to an authentication protocol that is a standardized framework for enabling third-party applications 110 to access data associated with a user 185, while refraining from exposing the credentials of the user 185. The API service 165 may additionally, or alternatively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implementations, the directory management service 170 may communicate with a directory service 145 of the on-premises system 115 via a software agent 150 installed on one or more computers, servers, and/or devices of the on-premises system 115. Additionally, or alternatively, the directory management service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120).

The provisioning service 175 of the identity management system 120 may support user provisioning and deprovisioning. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some implementations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

In some examples, the computing system 100 may be used by an organization that includes one or more users 185 interacting with a computing device to communicate with the identity management system 120. In some cases, the identity management system 120 have a SSO service 155 to provide a seamless log-in process for one or more applications 110 within a cloud system 125. In some examples, the one or more applications 110 may be from different vendors and thus may be configured separately from each other. As such, a user 185 may have to authorize access for each application 110 connected to the identity management system 120 separately. For example, for a first application 110 to access the data associated with a user 185 within a second application 110, the user 185 may have to authorize or allow the first application 110 the access to the data within the second application 110. However, the quantity of applications 110 within the cloud system 125 may be relatively large. Therefore, having the user 185 authorize or allow access for a first application 110 to the data of the other applications 110 may be relatively time-consuming and inefficient.

As such, the techniques of the present disclosure describe the IdP being configured to issue tokens to provide access to applications on behalf of a user 185 to reduce the time-consumption for the user 185 and improve the efficiency of the integration of applications 110. For example, the IdP may receive, be configured by an IdP administrative user 185, or any combination thereof, a configuration (e.g., an API access policy) that may enable the IdP to support cross-application authorization and issue tokens on behalf of a user of an application. For example, opposed to the computing device 105 of the user 185 receiving tokens to access applications 110, the IdP may be enabled to issue tokens to the applications 110 to provide a more efficient use of resources when authorizing access between applications 110 (e.g., a cross-application authorization process). As such, the IdP may receive a request for a first token from a first application 110 on behalf of a user 185. The first token may be usable by the first application 110 to obtain a second token from the IdP to enable the cross-application authorization between the first application and a second application 110.

Figure 2:
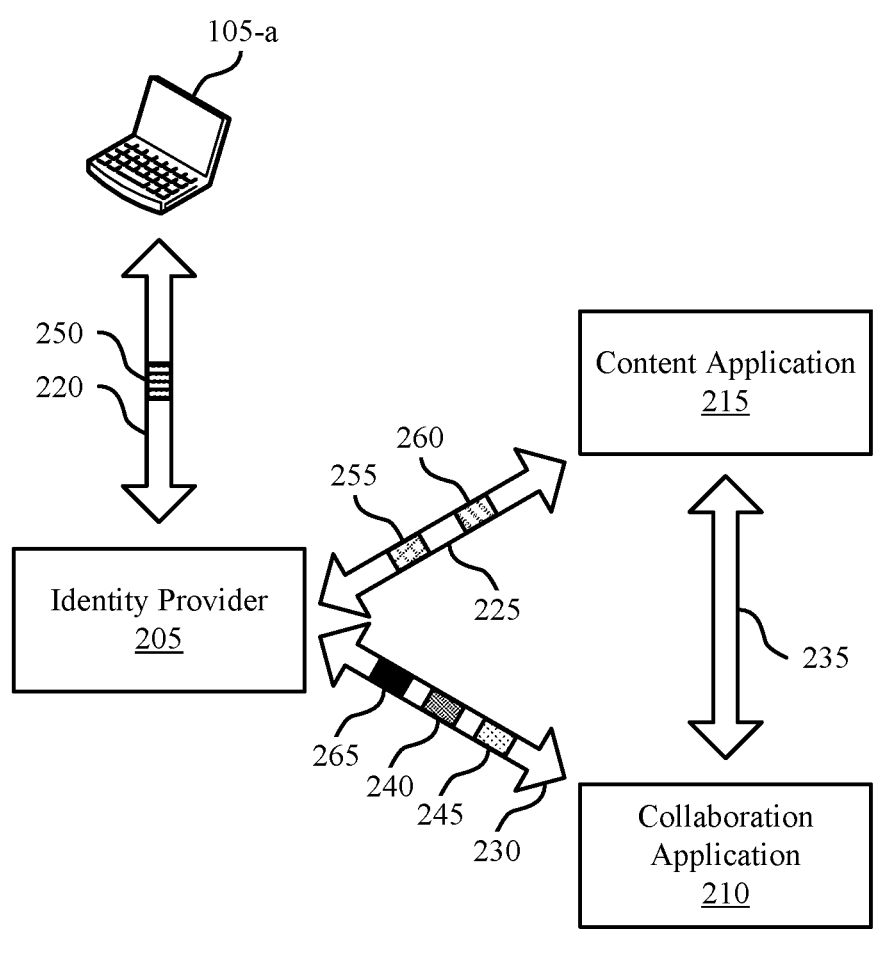
Figure 2:
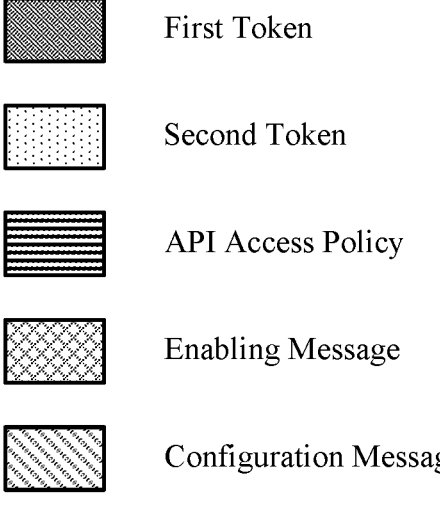
Figure 2:
Figure 3:
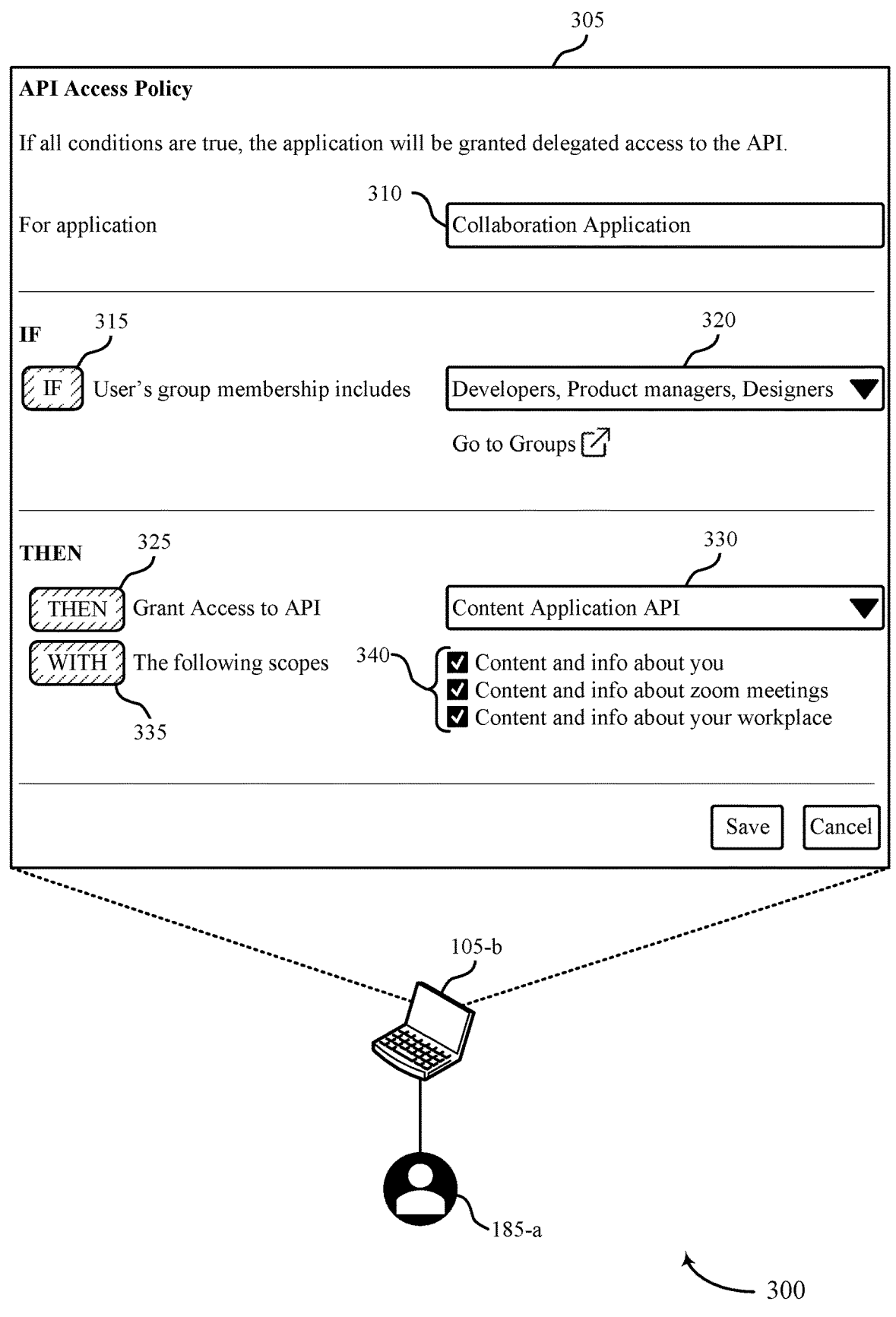

Based on the IdP transmitting the first token to the first application 110 and the first application 110 receiving the first token in accordance with the configuration for the cross-application authorization, the IdP may assist in the first application 110 exchanging the first token for a second token. The first application may then use the second token to access an API of the second application 110 (e.g., via the API service 165). Using the API, the first application 110 may transmit one or more API requests to the second application 110 to gain access to data corresponding to a user 185 of the first application 110. and the second application 110. Further descriptions of the techniques of the present disclosure may be provided elsewhere herein including with reference to FIGS. 2 through 3. FIGS. 2 through 3 may further describe how the access to the applications 110 may be granted by the IdP which may be more time efficient compared to the user 185 granting an application 110 access to each application 110 within the cloud system 125 connected to the identity management system 120 individually.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

FIG. 2 shows an example of a computing system 200 that supports techniques for cross-application authorization in accordance with aspects of the present disclosure. In some examples, the computing system 200 may be implemented by or may implement the computing system 100. For example, the computing system 200 may include a computing device 105-a, an IdP 205 (such as the identity management system 120), a collaboration application 210, and a content application 215 which may be examples of devices and services described with reference to FIG. 1 (e.g., applications 110). The computing device 105-a may communicate with the IdP 205 via a communication link 220, the IdP 205 may communicate with the collaboration application 210 via a communication link 225 and with the content application 215 via a communication link 230, and the collaboration application 210 and the content application 215 may communicate via a communication link 235. The communication link 220, the communication link 225, the communication link 230, and the communication link 235 may be associated with communications over a wired network (e.g., the Internet), a wireless network (e.g., a cellular network, a WLAN) and may be further described elsewhere herein with reference to FIG. 1.

As described elsewhere herein, an organization using the computing system 200 may use one or more applications (e.g., the collaboration application 210 and the content application 215), which may be implemented as software as a service (SaaS) applications in a system (e.g., the computing system 200) supported by an IdP 205. SaaS applications may be applications that are hosted via the cloud (e.g., the cloud system 125, as described with reference to FIG. 1) and may be provided to users via the Internet (e.g., via a wired or wireless WLAN connection). In some cases, different software providers or SPs may provide the SaaS applications and the cloud platform that hosts the SaaS applications. For a best-of-breed configuration, the organization may have multiple SaaS applications from multiple different software providers. In a single-vendor configuration, the multiple SaaS applications used by the organization may be from the same software provider.

When using SaaS applications, the SaaS application may need to integrate with a user's existing application ecosystem. For example, when using a best-of-breed configuration, the users of the organization may have a seamless login process to the different SaaS applications via an SSO service (e.g., the SSO service 155, as described with reference to FIG. 1). However, in some examples, a user may have to authorize the access and integration between each application of the system supported by the IdP 205. That is, for an application (e.g., the collaboration application 210) to access a user's data within the other applications (e.g., the content application 215) supported by the IdP 205, the user may have to provide an authorization input (e.g., an accept/deny selection input) for each individual application integration. For example, for the collaboration application 210 to integrate with the content application 215 and access data corresponding to a user of the collaboration application 210 and the content application 215, the user would have to authorize (e.g., accept the access via an OAuth framework) the collaboration application 210 accessing the content application 215.

Before initiating an OAuth process, a client application (e.g., the collaboration application 210) may register with an OAuth provider (e.g., an authorization server). For example, to start the OAuth process, a user may interact with the collaboration application 210 and perform an action that may expect to access data corresponding to the user stored within a separate application (e.g., the content application 215) or storage resource (e.g., a cloud storage provider). The collaboration application 210 may then request authorization (e.g., permission) from the user to access the data associated with the user stored in the content application 215. In some cases, the request may also include a level of access to the data (e.g., requesting read, write, or read-write permissions). Further, the collaboration application 210 may redirect the user to an authorization server as part of the authorization request and the user may log-in to authenticate themselves (e.g., if the user was not already logged in).

Once the user is authenticated, the user may approve or deny the authorization request from the collaboration application 210 via an input from the user (e.g., a button selection). If the user approves the authorization request, the authorization server may provide an authorization grant (e.g., a first token 240) to the collaboration application 210. The collaboration application 210 may then transmit the authorization grant to the authorization server to request an access token (e.g., a second token 245) to access an API of the content application 215. The authorization server may receive and validate the authorization grant and if validated the authorization may issue the access token to the collaboration application 210. Using the access token, the collaboration application 210 may transmit one or more requests to a resource server (e.g., an API) on behalf of the user to receive data corresponding to the user. In such cases, the access token may indicate that the user has given permission to the collaboration application 210 to make such API requests. Based on the resource server verifying the validity of the access token, the collaboration application 210 may be granted access to the data associated with the user stored in the content application 215.

In some examples, the collaboration application 210 may use a user impersonation procedure to act on behalf of a user. For example, an administrative user of an application (e.g., the collaboration application 210) may install the application for a user and install hook files with a client authentication identifier (e.g., oauthClientId) and a shared secret (e.g., a piece of data only known between two parties to ensure secure communications). The application may then create a JavaScript open notation (JSON) web token (JWT) assertion with the shared secret and the client authentication identifier and may transmit it to an authorization server to. The authorization server may then issue an access token (e.g., an OAuth 2.0 access token or the second token 245) to the application. As such, the application may use the access token to perform actions as the user. Access tokens may be a type of token that includes security credentials of the user and may be used to make API requests as if the API request is coming directly from the user.

Further, in some cases, the computing system 200 may use a service account model or two-legged OAuth (2LO), where an application may have credentials and permissions to directly access data and resources associated with a user. As such, a 2LO process may refrain from requesting consent or permission from a user to access the data associated with the user. Such process may be commonly used for scenarios where delegation of access may be at a tenant and admin level (opposed to a user level), as there may be relatively fewer security concerns about granting access between tenants and administrative users than to an outside user. As such, an application may implement a fine-grained authorization (FGA) model as part of the 2LO process.

In some other cases, the computing system 200 may support a three-legged OAuth (3LO) framework. 3LO may be a form of OAuth that includes three parties. The three parties may include a user (e.g., the user that owns or may be associated with the data the collaboration application 210 may be requesting access to), a client application (e.g., the collaboration application 210 that may be requesting access to the user's data), and an authorization server (e.g., the server that manages the authentication of the user's identity and the authorization of data access). The 3LO process may initiated by the user granting permission to the client application to access the data associated with the user. The client application may then request an access token from the authorization server by presenting a token (e.g., the first token 240) the indicates the user's consent (e.g., permission) and credentials. The authorization server may then validate the request and issue an access token (e.g., the second token 245) to the client application to be used to access the data associated with the user on behalf of the user.

3LO may be commonly used when a user may want to grant access to data associated with the user to an application (e.g., the collaboration application 210) while refraining from sharing the user's login credentials. As such, 3LO may provide a secure and standardized way for users to authorize access data associated with the user within other applications. Further, 3LO may be referred to as ActAs model where an application may be granted permission to access data on behalf of a user where the application may only be able to access the data that the user grants access to and the user delegates. As such, 3LO may expect the user to consent to providing delegated access permissions to third-party applications. Further, the authorization and audit may be in the context of an end-user. Moreover, 3LO may be used for scenarios where an application may request access to an end-user's data (e.g., files, documents, content, or any combination thereof). As such, applications may be capable of delegating an FGA service to an origin system that may own or store the data associated with the user.

However, as the quantity of applications within the computing system 200 increases the quantity of authorizations that the user may have to perform may increase accordingly. For example, as described herein, a 3LO process may expect a user to grant access to an application to access data associated with the user. As such, if the collaboration application 210 wants to access data associated with the user that may be stored within the content application 215, the user would have to consent to such access by approving an authorization request (e.g., providing a user input). However, since the user may be required to approve an authorization request for each application the collaboration application 210 may receive data (e.g., data associated with the user) from, the user may have to approve/deny a relatively large quantity of authorization requests (e.g., provide a relatively large quantity of user inputs) which may be inefficient, time-consuming, thus resulting in an increase of the latency of the authorization process. Further, there may be a decrease in the quality of the user experience for the computing system 200.

For example, when an organization uses the best-of-breed configuration there may be a relatively large quantity of applications that the user would have to grant access to individually. Further, such authorization process may limit applications from building an intelligence and automation of a user's workflow. For example, if applications are integrated with each other in an inefficient manner, the system of applications (e.g., enterprise system or graph) may be unable to improve a user's workflow and efficiency. Additionally, or alternatively, administrative users may have to manage an increased security surface area due to the individual integrations between the quantity of applications within the computing system 200. Further, the current techniques may limit product lead growth (PLG) and self-service marketplaces.

In some examples, using the 3LO procedure may also limit the adoption of artificial intelligence (AI) models and machine learning (ML) model (e.g., large language models (LLMs). For example, since the user to may have to authorize each application interaction, the adoption, performance, and uses of AI/ML models to assist a user's workflow (e.g., introducing AI and LLM automation to the user's workflow) may be limited when using 3LO. Additionally, or alternatively, due to the exchange of tokens used in the 3LO procedure, there may be an increase of theft, loss, or both of tokens (e.g., authorization tokens and access tokens). Therefore, there may be a decrease in the reliability of the computing system 200 as the computing system 200 may be unable to provide a secure and safe service to user.

Generally, to support a centralized identity and access management capabilities for an organization, most SaaS applications (e.g., the collaboration application 210 and content application 215) may be connected to the IdP 205 of a computing system 200. In most cases, users of a computing device 105-*a* may use receive a better user experience from using an SSO service and administrators of the computing system 200 may receive better securing outcomes using MFA and zero-trust services (e.g., a service where the computing system 200 always requires verification and authentication for each action and refrains from automatically trusting any user or computing device 105). Further, an administrative user may enable most SaaS applications to trust the computing device 105 for user authentication. However, current configurations may not support the administrator enabling SaaS applications to trust the computing device 105 for API authorization as the SaaS applications may rely on user input for API authorization.

To improve the efficiency and time-consumption of the authentication process and to provide a more secure system, the techniques of the present disclosure may describe applying the federation and patterns used for SSO for OAuth procedures to access APIs. Such techniques may enable the computing system 200 to centralize more access decisions across an ecosystem (e.g., an integrated collection) of SaaS applications. Further, the techniques described herein may provide an enhanced user experience for users of a computing device 105 (e.g., the computing device 105-*a*) that expect to connect and integrate multiple applications (e.g., the collaboration application 210 and content application 215) via OAuth procedures (e.g., via OAuth 2.0). For example, the Authorization Cross-Domain Code (ACDC) 1.0 may define an additional JWT grant type that may be configured to enable federation for an authorization server across policies or administrative boundaries. For example, a SaaS authorization server may trust tokens issued by the IdP 205 and may map claims to a known service account that may have fixed permissions. Further, the client credential management may be delegated from the authorization server to the IdP 205. As such, the computing device 105 that may be trusted by applications for SSO may be enabled to broker (e.g., arrange) access to APIs for the applications via the IdP 205.

By extending the support for the ACDC grant to token exchange requests, applications (e.g., the collaboration application 210) may be enabled to request access to third-part applications (e.g., the content application 215). Such requests may be communicated using backchannel operations (e.g., communicating with the IdP 205 via the communication link 230) that may refrain from interrupting an end-user's interactive experience with an application (e.g., due to an user input for an authorization request). Further, the techniques of the present disclosure may be useful for application deployments where the SSO may be SAML-based.

To enable the techniques of the present disclosure the IdP 205 may be configured by an administrative user of the IdP 205 (e.g., the administrative user using the computing device 105-*a*) with an API access policy 250. In some examples, the API access policy 250 may support cross-application authorization between the collaboration application 210 and the content application 215 and other applications associated with the IdP 205. The API access policy 250 may also be configured to enable the IdP 205 to issue tokens (e.g., the first token 240, the second token 245, or both) on behalf of a user of the collaboration application 210 and the content application 215. The API access policy 250 may also define policy within the IdP 205 to enable applications (e.g., the collaboration application 210) to automate requests on behalf of users instead of having the end-users consent to the scope of data an application may access via an API request. Additionally, or alternatively, the API access policy 250 may define what user information the collaboration application 210 may be able to access via an API of the content application 215. In some examples, the API access policy 250 may also support 3LO between the collaboration application 210 and the content application 215 as described herein. The API access policy 250 may be described elsewhere herein including with reference to FIG. 3.

As part of the API access policy 250, the administrative user of the IdP 205 may enable the collaboration application 210 to request tokens (e.g., the first token 240, the second token 245, or both) on behalf of users. As such, the IdP 205 may transmit an enabling message 255 to the collaboration application 210 that may indicate that the collaboration application 210 should request tokens from the IdP 205 to access APIs of the collaboration application 210. That is, the enabling message 255 may enable the collaboration application 210 to request the first token 240 (e.g., via a request message 260) from the IdP 205 in accordance with the API access policy 250 that may be for cross-application authorization between the collaboration application 210 and the content application 215.

Additionally, or alternatively, an administrative user of the content application 215 may configure the content application 215 to trust the IdP 205 as an API SSO provider. That is, the content application 215 may trust the IdP 205 to provide APIs to the content application 215 based on the content application 215 trusting the IdP 205 for the SSO procedures. Moreover, the content application 215 may be configured to trust the IdP 205 to issue an authorization token (e.g., the first token 240) to one or more applications (e.g., the collaboration application 210) associated with the IdP 205 while refraining from receiving any additional input from a user. Further, the IdP 205 may be configured to operate as an API SSO provider for the collaboration application 210, the content application 215, or both. As such, the IdP 205 may receive a configuration message 265 that provides a configuration for the API access policy 250 that may enable the IdP 205 to issue tokens (e.g., the first token 240, the second token 245, or both) to the collaboration application 210 on behalf of a user of the collaboration application 210.

As such, based on the IdP 205 being configured with the API access policy 250, the collaboration application 210 receiving the enabling message 255, and the IdP 205 receiving the configuration message 265 from the content application 215, the IdP 205 may be capable supporting cross-application authorization between applications associated with or connected to the IdP 205. For example, a user may login to the collaboration application 210 via a SSO and the user may perform an action where the collaboration application 210 may expect to use data associated with the user that may be stored in the collaboration application 210. In some examples, the IdP 205 may receive the login credentials based on receiving a request to access the collaboration application 210 from a user via a user interface of the IdP 205 using a SSO service where the request may include the login credentials of a respective user of the collaboration application 210. Following, the collaboration application 210 (e.g., a requesting application) may transmit a request message 260 to the IdP 205 to receive access to the content application 215 (e.g., a resource application). In some examples, to transmit the request message 260, the collaboration application 210 may be registered as a client (e.g., an OAuth 2.0 client) with a IdP 205 authorization server and with the content application 215. Further, the computing system 200 may establish a trust relationship between the IdP 205 and the content application 215 for SSO and for cross-application authorization. Additionally, or alternatively, the computing system 200 may grant or configure the collaboration application 210 to act on behalf of users of the content application 215 with a set of scopes (e.g., restrictions).

Therefore, the IdP 205 may receive the request message 260 from the collaboration application 210 for the collaboration application 210 to receive a first token 240. In some examples, the first token 240 may be referred to as an OAuth authorization grant, a bootstrap token, a signed ACDC JWT (e.g., signed by the IdP 205), or any combination thereof. In some cases, the request message 260 may specify the target application the collaboration application 210 may be requesting a connection with (e.g., the content application 215), a scope of data to be requested from the target application, and the target subject for the request message 260 (e.g., token request message 260) based on passing the users SSO assertion. Further, the collaboration application 210 may also provide client credentials to authenticate the collaboration application 210 as having permission to act on behalf of a user.

The IdP 205 may then evaluate the API access policy 250 and determine if the collaboration application 210 should receive the first token 240 and be granted access to the content application 215 on behalf of a user. In some examples, the IdP 205 may determine that the request message 260 may be a valid request and includes valid credentials. As such, the IdP 205 may transmit the first token 240 to the collaboration application 210 in accordance with the API access policy 250. In some other examples, the IdP 205 may determine that the request message 260 may be invalid and thus the request message 260 may be denied. Additionally, or alternatively, in some cases, the IdP 205 may inspect the request message 260 to determine if a step-up authentication procedure should be performed. For example, if the authentication information included in the request message 260 fails to meet some policy requirements (e.g., security or configuration requirements) the IdP 205 may determine that a step-up authentication procedure should be used to receive additional authentication information. As such, the IdP 205 may transmit an OAuth error (e.g., insufficient_user_authentication) response to the collaboration application 210 via the communication link 230 and may indicate the authentication requirements that should be satisfied, the additional authentication information the IdP 205 may expect, or both.

As described herein, a step-up authentication procedure generally refers to a procedure where some additional authentication is expected from the collaboration application 210 (beyond the login credentials of the SSO). In some examples, the additional authentication may be based on a trigger event. For example, if the collaboration application 210 indicates in the request message 260 that the collaboration application 210 may be requesting some sensitive data associated with a user (e.g., PIN information, private personal information (PPI), or other sensitive or confidential information associated with the user). As such, the IdP 205 may transmit a message to the collaboration application 210 requesting additional authentication before accepting or denying the request message 260. Some examples of additional authentication may be a passphrase, a one-time password (OTP) provided to a user, an answer to a security question, a smart card code, a biometric scan (e.g., facial scan, fingerprint scan, retinal scan), or any combination thereof. In some examples, the additional authentication may require a user input at the collaboration application 210. In some other examples, the collaboration application 210 may be able to provide the additional authentication based on information and data stored on a user. As such, based on the collaboration application 210 providing the additional authentication (e.g., with or without a user input), the IdP 205 may verify the information and grant or deny access to the collaboration application 210 accordingly. Using the step-up authentication procedure, the computing system 200 may be capable of ensuring that sensitive data stored within applications may be managed in a secure manner which may result in an increase in trust and reliability in the computing system 200.

In cases where the IdP 205 determines that the request message 260 may be a valid request message 260 the IdP 205 may transmit the first token 240 to the collaboration application 210 accordingly. Once the collaboration application 210 receives the first token 240, the collaboration application 210 may exchange the first token 240 for the second token 245. The second token 245 may be usable by the collaboration application 210 to access an API of the content application 215 in accordance with the API access policy 250 for cross-application authorization between the collaboration application 210 and the content application 215. In some cases, the second token 245 may be referred to as an access token and may include an OAuth access token, an OAuth refresh token, or both. In some examples, the exchange of the first token 240 for the second token 245 may include the collaboration application 210 transmitting the first token 240 back to the IdP 205 indicating a request for the second token 245, the IdP 205 receiving the first token 240, and the IdP 205 transmitting the second token 245 to the collaboration application 210 based on receiving the first token 240. Further, in some cases, based on receiving the first token 240, IdP 205 may transmit a message to the collaboration application 210 that indicates an access token, a token type (e.g., bearer), and a refresh token. Based on receiving the second token 245, the collaboration application 210 may gain access to an API of the content application 215 and the collaboration application 210 may transmit one or more API request messages to the collaboration application 210 to receive data associated with the user.

Such integration of applications (e.g., the collaboration application 210 and the content application 215) may allow for an improved end-user experience within the computing system 200. For example, the collaboration application 210 may be an email client application and the content application 215 may be a video conferencing client application. As such, a user of the email client application may wish to embed a recording of a video conference call within an email. That is, the user may wish for the recording to be capable of being displayed and watched from within the email. However, to access the recording, the email client application may expect access to data from the video conferencing client application (e.g., the password for the recording). As such, opposed to the user being requested to authenticate and grant the email client application access to data stored within the video conference client application, the techniques of the present disclosure may enable the IdP 205 to grant the email client application access to such data. Therefore, the user experience may be improved based on the email client application refraining from requesting a user input to authorize the email client application access to the video conferencing client application which may save the user time and may provide for a streamlined use of the email client application.

Additionally, or alternatively, the user experience for an application administrative user may also be improved. For example, opposed to managing security for each application integration, the administrative user may simply indicate a trusted issuer for cross-application authorization. As such, the administrative user may indicate that the IdP 205 may be a trusted issuer for an application which may be a single configuration for the administrative user of an application to manage. Therefore, the experience of an application administrative user may be enhanced by reducing the complexity of securing of an application while maintaining a highly secure application. Further, the user experience of an IdP 205 administrative user may improved based on the API access policy 250. Such user experience improvements and further description of the API access policy 250 may be described elsewhere herein with reference to FIG. 3.

As such, the techniques of the present disclosure may improve a user's (e.g., an application user, an application administrative user, an IdP 205 administrative user) overall experience by proving support for federation for SSO and API access with OAuth. In some cases, there may be a relatively high cost (e.g., resource cost and time consumption cost) and a relatively high level of complexity from syncing all the data within a SaaS ecosystem with service accounts and implementing a custom authorization model on top of commingled data. Further, some browsers (e.g., web browsers to access the Internet) may have deprecated support for third-part cookies due to privacy tradeoffs, thereby eliminating the ability for SaaS applications to make cross-origin requests via a browser. Additionally, or alternatively, there may not be a standard set of APIs for IdPs 205 to manage and audit integrated (e.g., via OAuth procedures) SaaS applications. As such, the techniques of the present disclosure may provide for a computing system 200 that may reduce the cost and complexity of integrating applications by refraining from having a separate integration configuration for each application integration and simply having devices trust the IdP 205 to issue tokens. Therefore, the techniques of the present disclosure may improve the current 2LO and 3LO techniques. Further descriptions of such techniques may be described elsewhere herein including with reference to FIGS. 3 and 4.

FIG. 3 shows an example of a computing system 300 that supports techniques for cross-application authorization in accordance with aspects of the present disclosure. In some examples, the computing system 300 may be implemented by or may implement the computing system 100 and/or the computing system 200. For example, the computing system 300 may include a user 185-*a* using a computing device 105-*b* via a user interface 305 of the computing device 105-*b* which may be examples of devices or services described elsewhere herein with reference to FIG. 1 (e.g., the interface 190). The user interface 305 may contain one or more fields (e.g., an application field 310, a membership selection field 320, and an API selection field 330

In some examples, the user 185-*a* which may be an administrative user and the computing device 105-*b* may be operated by the administrative user. In some cases, the user 185-*a* may be an administrative user for an application within an ecosystem of applications (e.g., a collection of applications used together), an administrative user of an IdP (e.g., the IdP 205 described with reference to FIG. 2), or both. In illustration of FIG. 3, the user 185-*a* may be an administrative user of an IdP but it should be understood that the user 185-*a* may be any other type of user described herein.

In some examples, the user 185-*a* may operate the computing device 105-*b* via a user interface 305. As illustrated in FIG. 3, the user interface 305 may be a user interface 305 of an API access policy that is configured to enable cross-application authorization between applications associated with an IdP that may be configured to issue tokens on behalf of a user (e.g., different from or the same as the user 185-*a*) of a first application and a second application. Within the user interface 305, the user 185-*a* may define the first application within the application field 310 of the user interface 305. The application indicated within the application field 310 may be described elsewhere herein as the first application. In some examples, the application field 310 may be a text based field where the user 185-*a* may enter the name of an application. In some other examples, the application field 310 may be a selection field that may include a drop-down menu for the user 185-*a* to select an application from a list of applications associated with the IdP that the user 185-*a* may be the administrative user for. As such, the application field 310 may be used to define an application (e.g., the first application) that may be granted access to an API based on a condition 315 being satisfied.

In some examples, the condition 315 may be an "if condition" such that to grant access the first application access to an API the condition 315 must be satisfied. The condition 315 be based on a group membership of a user of the first application and whether the group membership of the user includes one or more groups listed in the membership selection field 320. The user 185-*a* (e.g., the administrative user of an IdP) may define the one or more groups to be checked within the membership selection field 320. That is, the user 185-*a* may select one or more groups from a list of groups in a drop-down menu. In some examples, the user 185-*a* may define or configure a Boolean operator for the values of the membership selection field 320 of the condition 315. For example, the user 185-*a* may configure the condition 315 such that the condition 315 may be satisfied if the user of the first application is a member of at least one of the groups listed within the membership selection field

320. That is, there may be an "OR" operator between each element selected and listed in the membership selection field 320. In some other examples, the condition 315 may be satisfied if the user of the first application is a member of each group listed within the membership selection field 320. That is, there may be an "AND" operator between each element selected and listed in the membership selection field 320.

Further, the user 185-*a* may define a condition 325 (e.g., a "then condition") and a condition 335 (e.g., a "with condition") for when the condition 315 may be satisfied. For example, the condition 325 may define which API the first application should be granted access to via the API selection field 330. Similar to the membership selection field 320, the user 185-*a* may select one or more APIs that the first application will be granted access to when the condition 315 may be satisfied from a list of APIs in a drop-down menu. Further, the condition 335 may define the scope of the API indicated via the API selection field 330 of the condition 325. For example, there may be one or more content selections 340 for the user 185-*a* to select from that determines what type of content the API indicated via the API selection field 330 may be capable of accessing. In some examples, the one or more content selections 340 may include a first content selection 340 that indicates that the API may be capable of accessing content and information about the user of the first application, a second content selection 340 that indicates that the API may be capable of accessing content and information about the application the API may be for, and a third content selection 340 that indicates that the API may be capable of accessing content and information about an organization that the user of the first application may belong to. In some examples, the one or more content selections may be selected by the user 185-*a* via checkboxes as illustrated in FIG. 3. In some other examples, the user 185-*a* may select the one or more content selections 340 from a drop-down menu or any other type of selection format. Therefore, the user 185-*a* may be able to select all, none, or a subset of the one or more content selections 340 to indicate what information the API indicated via the API selection field 330 may be able to obtain.

As such, the API access policy displayed via the user interface 305 of the computing device 105-*b* may be configured by the user 185-*a* such that the condition 315 is satisfied based on the user of the first application belonging to the groups (e.g., or at least one of the groups) indicated in the membership selection field 320. Based on the condition 315 being satisfied, the user 185-*a* may configure the condition 325 to define the API that the first application may be granted access to via the API selection field 330. The user 185-*a* may also define the condition 335 to define the information that the API indicated in the API selection field 330 may be capable of obtaining based on the user 185-*a* selecting one or more of the content selections 340. Therefore, an IdP may issue tokens to the first application based on determining that a user of the first application may be a member of one or more groups that satisfies a group membership criterion (e.g., the condition 315) within the configuration of the API access policy that may integrate the first application with a second application.

For example, the API access policy displayed via the user interface 305 may state that a first application may be granted delegated access to an API of a second application based on the condition 315 being satisfied. The condition 315 may be defined as an "if" condition where if the group membership of user of the first application includes being a member of a developers group, a product managers group, and a designers group within an organization the condition 315 may be satisfied. As such, the condition 325 may indicate the API of the second application that the first application would be granted access to based on the user of the first application satisfying the condition 315. Further, the condition 335 may define the selections of what type of data the first application may receive from the second application via the API of the application. For example, the one or more content selections 340 may determine that the user of the first application may be capable of accessing content and information about the user stored within the second application, content and information about events or data of the second application that may be associated with the user, and content and information about the organization of the user of the first application and the second application.

As such, the API access policy displayed via the user interface 305 of the computing device 105-*b* within the computing system 300 may enable an IdP to issue tokens for APIs of applications within the computing system 300. By using such techniques, the overall user experience of the computing system 300 may be enhanced and the complexity and time-consumption of the authentication process to integrate applications withing the computing system 300 may be reduced. Further descriptions of such techniques of the present disclosure may be described elsewhere herein including with reference to FIG. 4.

Figure 4:
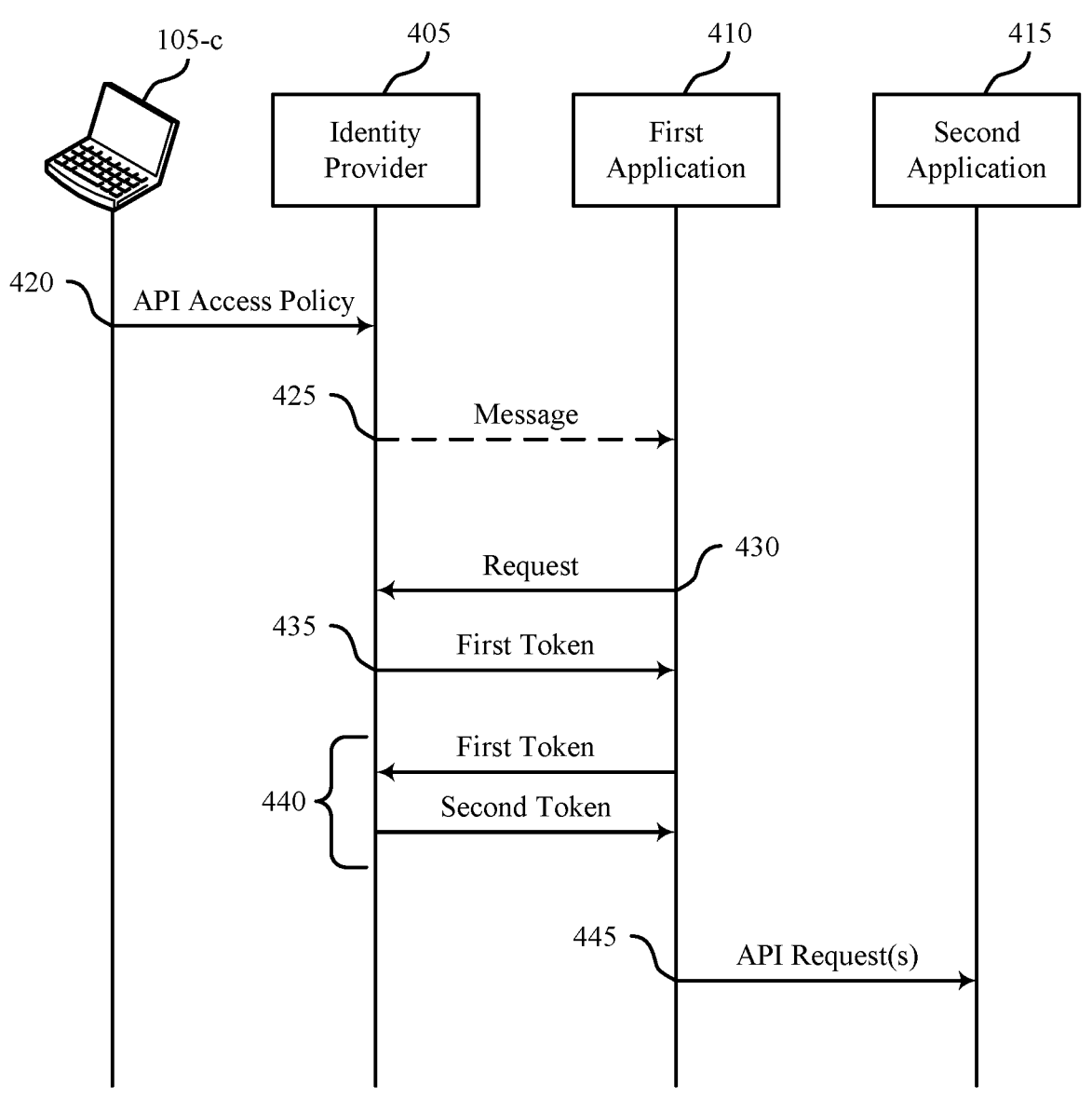
FIG. 4 shows an example of a process flow that supports cross-application authorization for enterprise systems in accordance with aspects of the present disclosure.

FIG. 4 shows an example of process flow 400 that supports techniques for cross-application authorization in accordance with aspects of the present disclosure. disclosure. In some examples, the process flow 400 may be implemented by or may implement the computing system 100, the computing system 200 and/or the computing system 300. For example, the process flow 400 may include a computing device 105-*c,* an IdP 405, a first application 410, and a second application 415, which may be examples of devices or services described elsewhere herein with reference to FIGS. 1 and 2 (e.g., the computing device 105, the IdP 205, and applications 110 respectively).

In the following description of the process flow 400, the operations between the computing device 105-*c,* the IdP 405, the first application 410, and the second application 415 may be performed in different orders or at different times. Some operations may also be left out of the process flow 400, or other operations may be added. Although the computing device 105-*c,* the IdP 405, the first application 410, and the second application 415 are shown performing the operations of the process flow 400, some aspects of some operations may also be performed by one or more other devices, services, or models described elsewhere herein including with reference to FIG. 1.

At 420, the IdP 405 may receive, from a computing device 105-*c* operated by a user 185, an API access policy that supports cross-application authorization between the first application 410 and the second application 415. The first application 410 and the second application 415 may be associated with the IdP 405 and the IdP 405 may be configured to issue tokens on behalf of a user of the first application 410 and the second application 415. In some examples, the API access policy may be configured by an administrative user 185 of the IdP 405 where the computing device 105-*c* may be operated by the administrative user 185.

In some cases, the IdP 405 may receive, from an administrative user of the second application 415, a configuration for the API access policy that enables the IdP 405 to issue a first token to the first application 410 on behalf of a user 185 of the first application 410. Further, the second application 415 may be configured to trust the IdP 405 to issue the first token to one or more applications (e.g., the first application 410) associated with the IdP 405 while refraining from receiving additional input from the user of the first application 410 and the second application 415. As such, the IdP 405 may be configured to operate as an API SSO provider for the first application 410 and the second application 415. In some examples, the API access policy may also define what user information the first application 410 may be capable of accessing via an API of the second application 415. Further, the API access policy may indicate that the IdP 405 may support 3LO between the first application 410 and the second application 415.

At 425, the IdP 405 may enable (e.g., via an enabling message) the first application 410 to request the first token from the IdP 405 on behalf of a user in accordance with the API access policy for cross-application authorization between the first application 410 and the second application 415. In some cases, the IdP 405 may also receive a request from a user of the first application 410 to access the first application 410 via a user interface of the IdP 405 using a SSO service. Further, the request may include a set of login credentials associated with the user of the first application 410. Based on being enabled to, at 430, the first application 410 may transmit, to the IdP 405, a request for a first token that may be usable to obtain a second token from the IdP 405 to enable cross-application authorization between the first application 410 and the second application 415. The first application 410 may transmit the request for the first token on behalf of the user of the first application 410 and the second application 415.

At 435, the IdP 405 may transmit the first token to the first application 410 in accordance with the API access policy for cross-application authorization between the second application 415 and the first application 410 from which the IdP 405 received the request for the first token from. At 440, the IdP 405 may receive the first token from the first application 410 and the IdP 405 may exchange the first token provided by the first application 410 for the second token, The second token may be usable to access an API of the second application 415 in accordance with the API access policy for cross-application authorization between the first application 410 and the second application 415. In some examples, as part of the exchange of the first token provided by the first application 410 for the second token, the IdP 405 may receive the first token from the first application 410 and transmit the second token to the first application 410 based on receiving the first token from the first application 410. In some other cases, the issuing of the first token and the second token to the first application 410 by the IdP 405 may be based on determining that the user of the first application may be a member of one or more groups that satisfy a group membership criterion within the API access policy that integrates the first application 410 with the second application 415. Additionally, or alternatively, the first token may include an OAuth authorization grant and the second token may include one or both of an OAuth access token or an OAuth refresh token that may be usable to access the API of the second application 415. In some cases, the second token may also include an indication of a type of token. Based on receiving the second token, at 445, the first application 410 may then transmit one or more API requests to the second application 415 using the second token.

Figure 5:
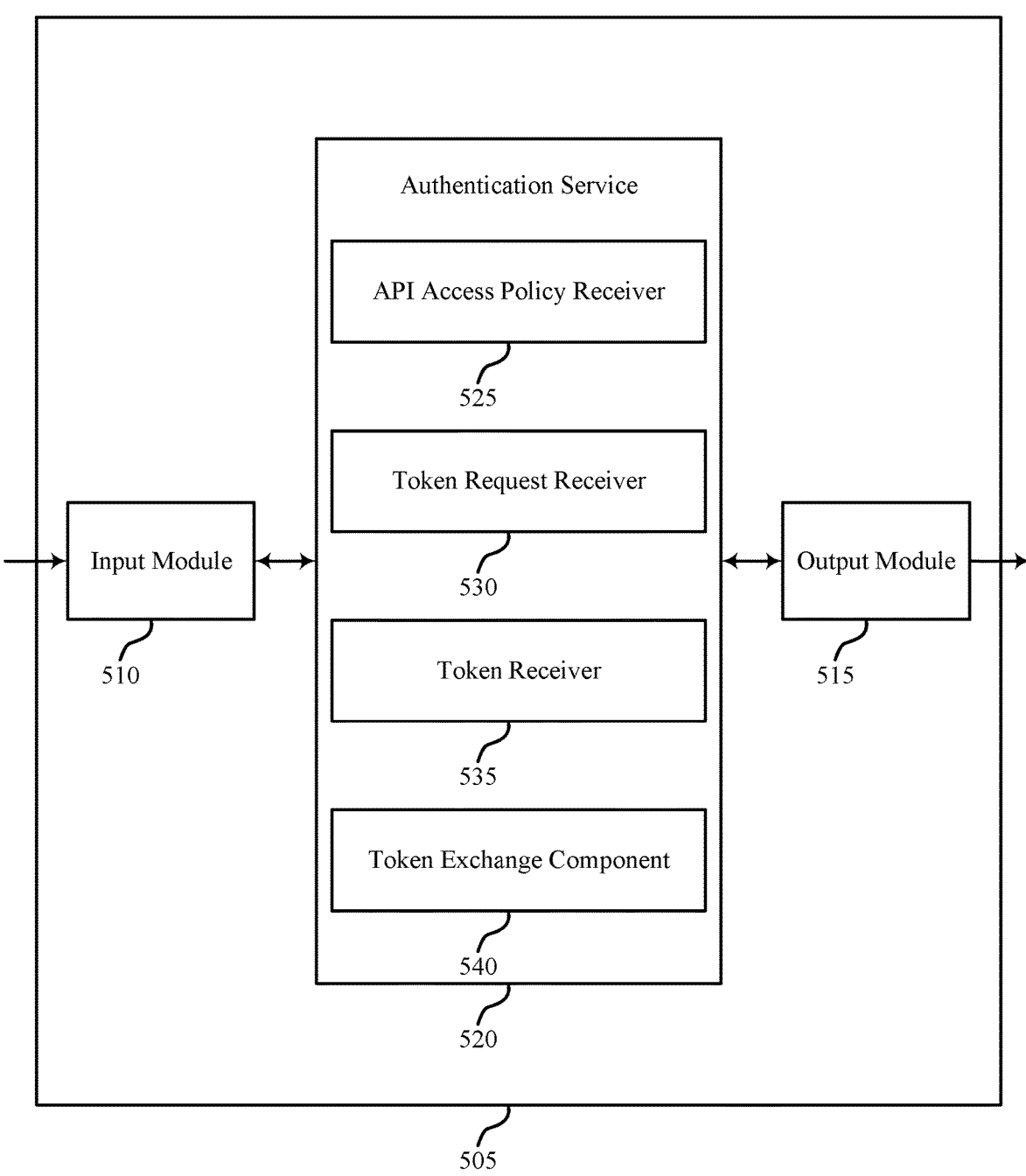
FIG. 5 shows a block diagram of an apparatus that supports cross-application authorization for enterprise systems in accordance with aspects of the present disclosure.

FIG. 5 shows a block diagram 500 of a device 505 that supports cross-application authorization for enterprise systems in accordance with aspects of the present disclosure. The device 505 may include an input module 510, an output module 515, and an authentication service 520. The device 505, or one of more components of the device 505 (e.g., the input module 510, the output module 515, and the authentication service 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS® MS-WINDOWS®, OS/2®, UNIX®, LINUX®, or another known operating system to handle input signals. The input module 510 may send aspects of these input signals to other components of the device 505 for processing. For example, the input module 510 may transmit input signals to the authentication service 520 to support cross-application authorization for enterprise systems. In some cases, the input module 510 may be a component of an input/output (I/O) controller 710, as described with reference to FIG. 7.

The output module 515 may manage output signals for the device 505. For example, the output module 515 may receive signals from other components of the device 505, such as the authentication service 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710, as described with reference to FIG. 7.

For example, the authentication service 520 may include an API access policy receiver 525, a token request receiver 530, a token receiver 535, a token exchange component 540, or any combination thereof. In some examples, the authentication service 520, or various components thereof, may be configured to perform various operations (e.g., receiving, monitoring, transmitting) using or otherwise in cooperation with the input module 510, the output module 515, or both. For example, the authentication service 520 may receive information from the input module 510, send information to the output module 515, or be integrated in combination with the input module 510, the output module 515, or both to receive information, transmit information, or perform various other operations as described herein.

The authentication service 520 may support cross-application authorization in accordance with examples as disclosed herein. The API access policy receiver 525 may be configured to support receiving an indication of an API access policy that supports cross-application authorization between a first application and a second application associated with an IdP that is configured to issue tokens on behalf of a user of the first application and the second application. The token request receiver 530 may be configured to support receiving, from the first application, a request for a first token that is usable to obtain a second token from the IdP to enable cross-application authorization between the first application and the second application, where the first token is requested on behalf of the user of the first application and the second application. The token receiver 535 may be configured to support transmitting the first token to the first application in accordance with the API access policy for cross-application authorization between the second application and the first application from which the request is received. The token exchange component 540 may be configured to support exchanging the first token provided by the first application for the second token that is usable to access an API of the second application in accordance with the API access policy for cross-application authorization between the first application and the second application.

Figure 6:
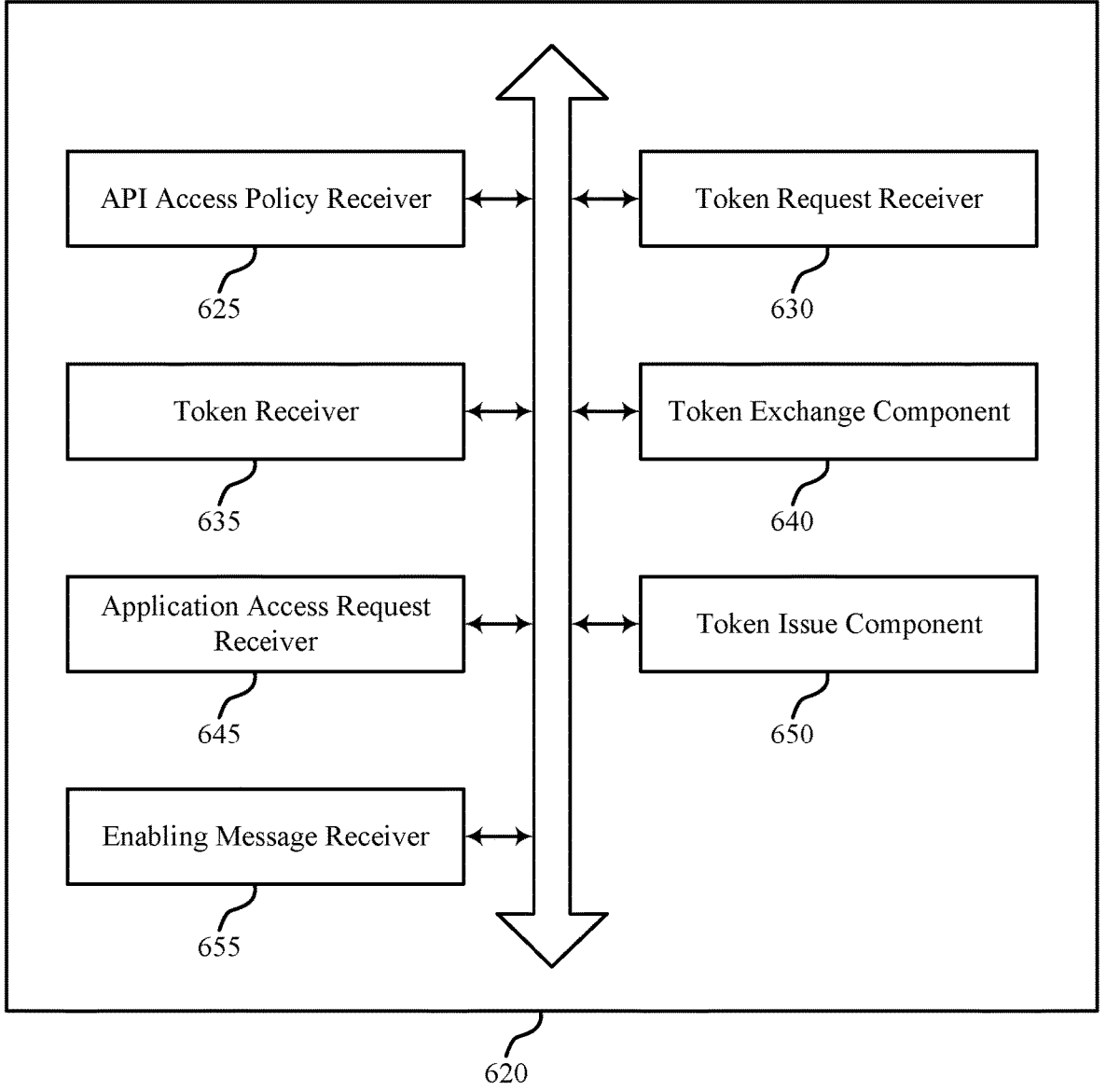
FIG. 6 shows a block diagram of an authentication service that supports cross-application authorization for enterprise systems in accordance with aspects of the present disclosure.

FIG. 6 shows a block diagram 600 of an authentication service 620 that supports cross-application authorization for enterprise systems in accordance with aspects of the present disclosure. The authentication service 620 may be an example of aspects of an authentication service 520, as described herein. The authentication service 620, or various components thereof, may be an example of means for performing various aspects of cross-application authorization for enterprise systems as described herein. For example, the authentication service 620 may include an API access policy receiver 625, a token request receiver 630, a token receiver 635, a token exchange component 640, an application access request receiver 645, a token issue component 650, an enabling message receiver 655, or any combination thereof. Each of these components, or components of subcomponents thereof (e.g., one or more processors, one or more memories), may communicate, directly or indirectly, with one another (e.g., via one or more buses).

The authentication service 620 may support cross-application authorization in accordance with examples as disclosed herein. The API access policy receiver 625 may be configured to support receiving an indication of an API access policy that supports cross-application authorization between a first application and a second application associated with an IdP that is configured to issue tokens on behalf of a user of the first application and the second application. The token request receiver 630 may be configured to support receiving, from the first application, a request for a first token that is usable to obtain a second token from the IdP to enable cross-application authorization between the first application and the second application, where the first token is requested on behalf of the user of the first application and the second application. The token receiver 635 may be configured to support transmitting the first token to the first application in accordance with the API access policy for cross-application authorization between the second application and the first application from which the request is received. The token exchange component 640 may be configured to support exchanging the first token provided by the first application for the second token that is usable to access an API of the second application in accordance with the API access policy for cross-application authorization between the first application and the second application.

In some examples, to support receiving the indication of the API access policy, the API access policy receiver 625 may be configured to support receiving, from an administrative user of the second application, a configuration for the API access policy that enables the IdP to issue the first token to the first application on behalf of a user of the first application.

In some examples, the enabling message receiver 655 may be configured to support enabling the first application to request the first token from the IdP on behalf of the user in accordance with the API access policy for cross-application authorization between the first application and the second application.

In some examples, the second application is configured to trust the IdP to issue the first token to one or more applications associated with the IdP without additional input from the user. In some examples, the IdP is configured to operate as an API SSO provider for the first application and the second application.

In some examples, the application access request receiver 645 may be configured to support receiving a request to access the first application via a user interface of the IdP using SSO, the request including a set of login credentials associated with the user of the first application.

In some examples, the token issue component 650 may be configured to support issuing the first token and the second token to the first application based on determining that the user is a member of one or more groups that satisfy a group membership criterion within the API access policy that integrates the first application with the second application.

In some examples, the API access policy defines what user information the first application is able to access via the API of the second application. In some examples, the API access policy is configured by an administrative user of the IdP.

In some examples, the first token includes an OAuth authorization grant and the second token includes one or both of an OAuth access token or an OAuth refresh token that is usable to access the API of the second application. In some examples, the API access policy supports 3LO between the first application and the second application.

Figure 7:
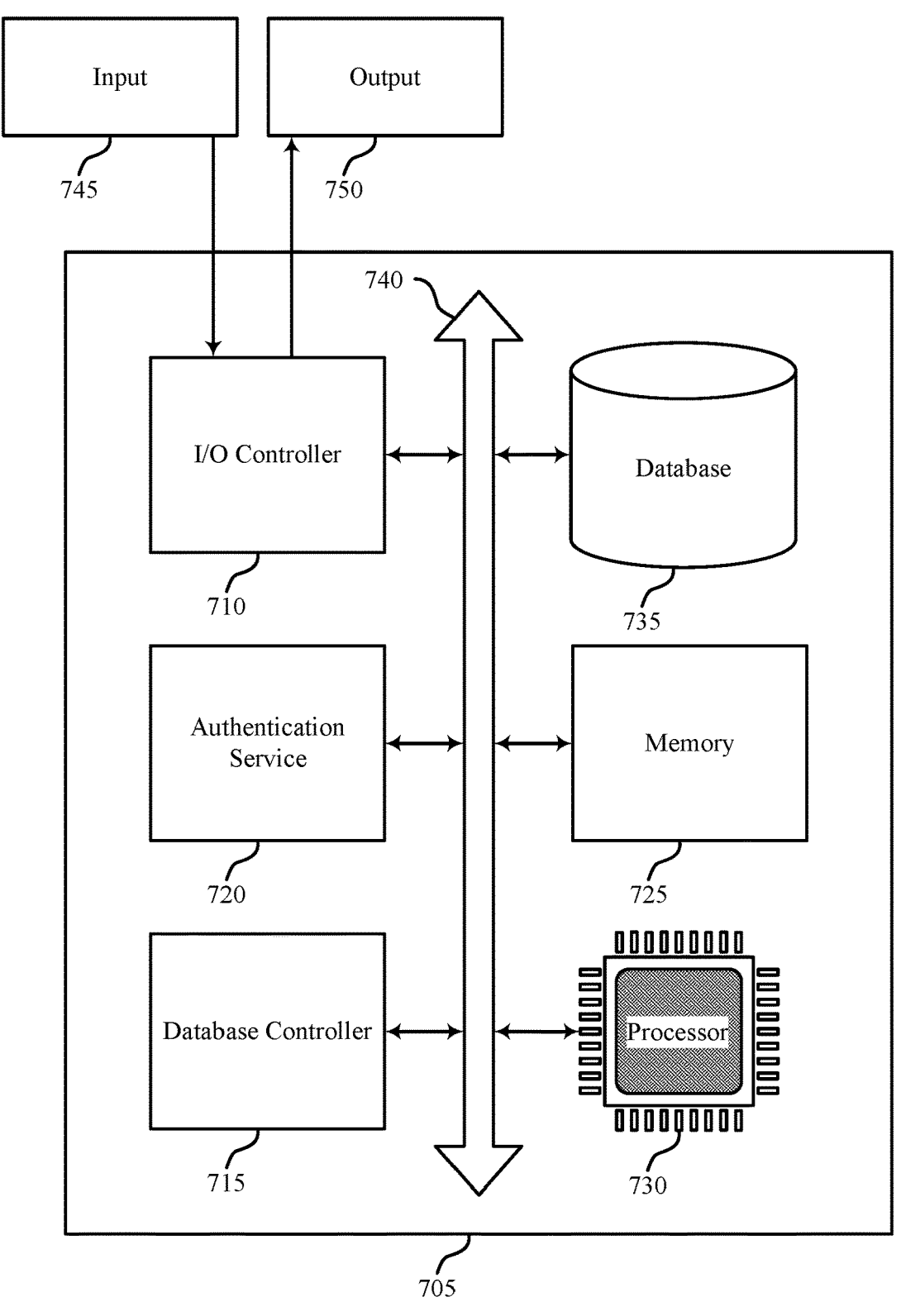
FIG. 7 shows a diagram of a system including a device that supports cross-application authorization for enterprise systems in accordance with aspects of the present disclosure.

FIG. 7 shows a diagram of a system 700 including a device 705 that supports cross-application authorization for enterprise systems in accordance with aspects of the present disclosure. The device 705 may be an example of or include the components of a device 505 as described herein. The device 705 may include components for bi-directional voice and data communications including components for transmitting and receiving communications, such as an authentication service 720, an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS) which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a central processing unit (CPU), a micro-controller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting cross-application authorization for enterprise systems). The processor 730 may be an example of a single processor or multiple processors. For example, the device 705 may include one or more processors 730.

The authentication service 720 may support cross-application authorization in accordance with examples as disclosed herein. For example, the authentication service 720 may be configured to support receiving an indication of an API access policy that supports cross-application authorization between a first application and a second application associated with an IdP that is configured to issue tokens on behalf of a user of the first application and the second application. The authentication service 720 may be configured to support receiving, from the first application, a request for a first token that is usable to obtain a second token from the IdP to enable cross-application authorization between the first application and the second application, where the first token is requested on behalf of the user of the first application and the second application. The authentication service 720 may be configured to support transmitting the first token to the first application in accordance with the API access policy for cross-application authorization between the second application and the first application from which the request is received. The authentication service 720 may be configured to support exchanging the first token provided by the first application for the second token that is usable to access an API of the second application in accordance with the API access policy for cross-application authorization between the first application and the second application.

By including or configuring the authentication service 720 in accordance with examples as described herein, the device 705 may enable an IdP to issue tokens to a first application to access a second application and to support cross-application authorization for an improved user experience of application users and administrative users, improved communication reliability, reduced latency of an authorization process, improved user experience related to the reduced latency, and improved coordination between devices.

FIG. 8 shows a flowchart illustrating a method 800 that supports cross-application authorization for enterprise systems in accordance with aspects of the present disclosure. The operations of the method 800 may be implemented by an identity management system (referred to hereinafter as an IdP) or components thereof. For example, the operations of the method 800 may be performed by an identity management system 120, as described with reference to FIGS. 1 through 7. In some examples, the identity management system may execute a set of instructions to control the functional elements of the identity management system to perform the described functions. Additionally, or alternatively, the identity management system may perform aspects of the described functions using special-purpose hardware.

At 805, the method may include receiving an indication of an API access policy that supports cross-application authorization between a first application and a second application associated with an IdP that is configured to issue tokens on behalf of a user of the first application and the second application. In some examples, aspects of the operations of 805 may be performed by an API access policy receiver 625, as described with reference to FIG. 6.

At 810, the method may include receiving, from the first application, a request for a first token that is usable to obtain a second token from the IdP to enable cross-application authorization between the first application and the second application, where the first token is requested on behalf of the user of the first application and the second application. In some examples, aspects of the operations of 810 may be performed by a token request receiver 630, as described with reference to FIG. 6.

At 815, the method may include transmitting the first token to the first application in accordance with the API access policy for cross-application authorization between the second application and the first application from which the request is received. In some examples, aspects of the operations of 815 may be performed by a token receiver 635, as described with reference to FIG. 6.

At 820, the method may include exchanging the first token provided by the first application for the second token that is usable to access an API of the second application in accordance with the API access policy for cross-application authorization between the first application and the second application. In some examples, aspects of the operations of 820 may be performed by a token exchange component 640, as described with reference to FIG. 6.

FIG. 9 shows a flowchart illustrating a method 900 that supports cross-application authorization for enterprise systems in accordance with aspects of the present disclosure. The operations of the method 900 may be implemented by an identity management system (referred to hereinafter as an IdP) or components thereof. For example, the operations of the method 900 may be performed by an identity management system 120, as described with reference to FIGS. 1 through 7. In some examples, the identity management system may execute a set of instructions to control the functional elements of the identity management system to perform the described functions. Additionally, or alternatively, the identity management system may perform aspects of the described functions using special-purpose hardware.

At 905, the method may include receiving, from an administrative user of the second application, a configuration for an API access policy that enables an IdP to issue a first token to a first application on behalf of a user of the first application. In some examples, aspects of the operations of 905 may be performed by an API access policy receiver 625, as described with reference to FIG. 6.

At 910, the method may include receiving an indication of the API access policy that supports cross-application authorization between the first application and the second application associated with the IdP that is configured to issue tokens on behalf of a user of the first application and the second application. In some examples, aspects of the operations of 910 may be performed by an API access policy receiver 625, as described with reference to FIG. 6.

At 915, the method may include receiving, from the first application, a request for the first token that is usable to obtain a second token from the IdP to enable cross-application authorization between the first application and the second application, where the first token is requested on behalf of the user of the first application and the second application. In some examples, aspects of the operations of 915 may be performed by a token request receiver 630, as described with reference to FIG. 6.

At 920, the method may include transmitting the first token to the first application in accordance with the API access policy for cross-application authorization between the second application and the first application from which the request is received. In some examples, aspects of the operations of 920 may be performed by a token receiver 635, as described with reference to FIG. 6.

At 925, the method may include exchanging the first token provided by the first application for the second token that is usable to access an API of the second application in accordance with the API access policy for cross-application authorization between the first application and the second application. In some examples, aspects of the operations of 925 may be performed by a token exchange component 640, as described with reference to FIG. 6.

FIG. 10 shows a flowchart illustrating a method 1000 that supports cross-application authorization for enterprise systems in accordance with aspects of the present disclosure. The operations of the method 1000 may be implemented by an identity management system (referred to hereinafter as an IdP) or components thereof. For example, the operations of the method 1000 may be performed by an identity management system 120, as described with reference to FIGS. 1 through 7. In some examples, the identity management system may execute a set of instructions to control the functional elements of the identity management system to perform the described functions. Additionally, or alternatively, the identity management system may perform aspects of the described functions using special-purpose hardware.

At 1005, the method may include receiving a request to access a first application via a user interface of an IdP using SSO, the request including a set of login credentials associated with the user of the first application. In some examples, aspects of the operations of 1005 may be performed by an application access request receiver 645, as described with reference to FIG. 6.

At 1010, the method may include receiving an indication of API access policy that supports cross-application authorization between a first application and a second application associated with an IdP that is configured to issue tokens on behalf of a user of the first application and the second application. In some examples, aspects of the operations of 1010 may be performed by an API access policy receiver 625, as described with reference to FIG. 6.

At 1015, the method may include receiving, from the first application, a request for a first token that is usable to obtain a second token from the IdP to enable cross-application authorization between the first application and the second application, where the first token is requested on behalf of the user of the first application and the second application. In some examples, aspects of the operations of 1015 may be performed by a token request receiver 630, as described with reference to FIG. 6.

At 1020, the method may include transmitting the first token to the first application in accordance with the API access policy for cross-application authorization between the second application and the first application from which the request is received. In some examples, aspects of the operations of 1020 may be performed by a token receiver 635, as described with reference to FIG. 6.

At 1025, the method may include exchanging the first token provided by the first application for the second token that is usable to access an API of the second application in accordance with the API access policy for cross-application authorization between the first application and the second application. In some examples, aspects of the operations of 1025 may be performed by a token exchange component 640, as described with reference to FIG. 6.

The following provides an overview of aspects of the present disclosure:

Aspect 1: A method for cross-application authorization, comprising: receiving an indication of an API access policy that supports cross-application authorization between a first application and a second application associated with an IdP that is configured to issue tokens on behalf of a user of the first application and the second application; receiving, from the first application, a request for a first token that is usable to obtain a second token from the IdP to enable cross-application authorization between the first application and the second application, wherein the first token is requested on behalf of the user of the first application and the second application; transmitting the first token to the first application in accordance with the API access policy for cross-application authorization between the second application and the first application from which the request is received; and exchanging the first token provided by the first application for the second token that is usable to access an API of the second application in accordance with the API access policy for cross-application authorization between the first application and the second application.

Aspect 2: The method of aspect 1, wherein receiving the indication of the API access policy comprises: receiving, from an administrative user of the second application, a configuration for the API access policy that enables the IdP to issue the first token to the first application on behalf of a user of the first application.

Aspect 3: The method of aspect 2, further comprising: enabling the first application to request the first token from the IdP on behalf of the user in accordance with the API access policy for cross-application authorization between the first application and the second application.

Aspect 4: The method of any of aspects 1 through 3, wherein the second application is configured to trust the IdP to issue the first token to one or more applications associated with the IdP without additional input from the user.

Aspect 5: The method of any of aspects 1 through 4, wherein the IdP is configured to operate as an API SSO provider for the first application and the second application.

Aspect 6: The method of any of aspects 1 through 5, further comprising: receiving a request to access the first application via a user interface of the IdP using SSO, the request comprising a set of login credentials associated with the user of the first application.

Aspect 7: The method of any of aspects 1 through 6, further comprising: issuing the first token and the second token to the first application based at least in part on determining that the user is a member of one or more groups that satisfy a group membership criterion within the API access policy that integrates the first application with the second application.

Aspect 8: The method of any of aspects 1 through 7, wherein the API access policy defines what user information the first application is able to access via the API of the second application.

Aspect 9: The method of any of aspects 1 through 8, wherein the API access policy is configured by an administrative user of the IdP.

Aspect 10: The method of any of aspects 1 through 9, wherein the first token comprises an OAuth authorization grant and the second token comprises one or both of an OAuth access token or an OAuth refresh token that is usable to access the API of the second application.

Aspect 11: The method of any of aspects 1 through 10, wherein the API access policy supports 3LO between the first application and the second application.

Aspect 12: An apparatus for cross-application authorization, comprising: one or more memories storing processor-executable code; and one or more processors coupled with the one or more memories, wherein the one or more processors are individually or collectively operable to execute the code to cause the apparatus to perform a method of any of aspects 1 through 11.

Aspect 13: An apparatus for cross-application authorization, comprising at least one means for performing a method of any of aspects 1 through 11.

Aspect 14: A non-transitory computer-readable medium storing code for cross-application authorization, the code comprising instructions executable by at least one processor to perform a method of any of aspects 1 through 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations, and does not represent all the examples that may be implemented, or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by one or more processors, firmware, or any combination thereof. If implemented in software executed by one or more processors, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers.

Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for cross-application authorization by an identity provider, comprising:

receiving, at the identity provider and from a first user associated with the identity provider, an indication of an application programming interface (API) access policy that supports cross-application authorization between a first application and a second application associated with the identity provider that is configured to issue tokens on behalf of a second user of the first application and the second application that is different from the first user;

receiving, at the identity provider and from the first application and on the behalf of the second user, a request for a first token that is usable to obtain a second token from the identity provider to enable the cross-application authorization between the first application and the second application;

transmitting, to the first application and in response to the request, the first token in accordance with the API access policy for the cross-application authorization between the second application and the first application from which the request is received; and exchanging, at the identity provider, the first token provided by the first application for the second token that is usable to access an API of the second application in accordance with the API access policy for the cross-application authorization between the first application and the second application.

2. The method of claim 1, wherein receiving the indication of the API access policy comprises:

receiving, from the first user that is an administrative user of the second application, a configuration for the API access policy that enables the identity provider to issue the first token to the first application on behalf of a respective user of the first application.

3. The method of claim 2, further comprising:

enabling the first application to request the first token from the identity provider on behalf of the second user in accordance with the API access policy for the cross-application authorization between the first application and the second application.

4. The method of claim 1, wherein the second application is configured to trust the identity provider to issue the first token to one or more applications associated with the identity provider without additional input from the first user, the second user, or both.

5. The method of claim 1, wherein the identity provider is configured to operate as an API single sign-on (SSO) provider for the first application and the second application.

6. The method of claim 1, further comprising:

receiving, at the identity provider, a request to access the first application via a user interface of the identity provider using single sign-on (SSO), the request comprising a set of login credentials associated with the second user of the first application.

7. The method of claim 1, further comprising:

issuing, to the first application, the first token and the second token based at least in part on determining that the second user is a member of one or more groups that satisfy a group membership criterion within the API access policy that integrates the first application with the second application.

8. The method of claim 1, wherein the API access policy defines a set of user information that the first application is able to access via the API of the second application.

9. The method of claim 1, wherein the API access policy is configured by an administrative user of the identity provider and wherein the first user is the administrative user or a different user.

10. The method of claim 1, wherein the first token comprises an OAuth authorization grant and the second token comprises one or both of an OAuth access token or an OAuth refresh token that is usable to access the API of the second application.

11. The method of claim 1, wherein the API access policy supports three legged OAuth (3LO) between the first application and the second application.

12. An apparatus for cross-application authorization, comprising:

one or more memories storing processor-executable code; and one or more processors coupled with the one or more memories and individually or collectively operable to execute the code to cause the apparatus to:

receive, at an identity provider and from a first user associated with the identity provider, an indication of an application programming interface (API) access policy that supports cross-application authorization between a first application and a second application associated with the identity provider that is configured to issue tokens on behalf of a second user of the first application and the second application that is different from the first user;

receive, at the identity provider and from the first application and on the behalf of the second user, a request for a first token that is usable to obtain a second token from the identity provider to enable the cross-application authorization between the first application and the second application;

transmit, to the first application and in response to the request, the first token in accordance with the API access policy for the cross-application authorization between the second application and the first application from which the request is received; and exchange, at the identity provider, the first token provided by the first application for the second token that is usable to access an API of the second application in accordance with the API access policy for the cross-application authorization between the first application and the second application.

13. The apparatus of claim 12, wherein, to receive the indication of the API access policy, the one or more processors are individually or collectively operable to execute the code to cause the apparatus to:

receive, from the first user that is an administrative user of the second application, a configuration for the API access policy that enables the identity provider to issue the first token to the first application on behalf of a respective user of the first application.

14. The apparatus of claim 13, wherein the one or more processors are individually or collectively further operable to execute the code to cause the apparatus to:

enable the first application to request the first token from the identity provider on behalf of the second user in accordance with the API access policy for the cross-application authorization between the first application and the second application.

15. The apparatus of claim 12, wherein the second application is configured to trust the identity provider to issue the first token to one or more applications associated with the identity provider without additional input from the first user, the second user, or both.

16. The apparatus of claim 12, wherein the first token comprises an OAuth authorization grant and the second token comprises one or both of an OAuth access token or an OAuth refresh token that is usable to access the API of the second application.

17. A non-transitory computer-readable medium storing code for cross-application authorization, the code comprising instructions executable by one or more processors to:

receive, at an identity provider and from a first user associated with the identity provider, an indication of an application programming interface (API) access policy that supports cross-application authorization between a first application and a second application associated with the identity provider that is configured to issue tokens on behalf of a second user of the first application and the second application that is different from the first user;

receive, at the identity provider and from the first application and on the behalf of the second user, a request for a first token that is usable to obtain a second token from the identity provider to enable the cross-application authorization between the first application and the second application;

transmit, to the first application and in response to the request, the first token in accordance with the API access policy for the cross-application authorization between the second application and the first application from which the request is received; and exchange, at the identity provider, the first token provided by the first application for the second token that is usable to access an API of the second application in accordance with the API access policy for the cross-application authorization between the first application and the second application.

18. The non-transitory computer-readable medium of claim 17, wherein to receive the indication of the API access policy, the instructions are executable by the one or more processors to:

receive, from the first user that is an administrative user of the second application, a configuration for the API access policy that enables the identity provider to issue the first token to the first application on behalf of a respective user of the first application.

19. The non-transitory computer-readable medium of claim 18, wherein the instructions are further executable by the one or more processors to:

enable the first application to request the first token from the identity provider on behalf of the second user in accordance with the API access policy for the cross-application authorization between the first application and the second application.

20. The non-transitory computer-readable medium of claim 17, wherein the first token comprises an OAuth authorization grant and the second token comprises one or both of an OAuth access token or an OAuth refresh token that is usable to access the API of the second application.

* * * * *